US009720186B2

(12) United States Patent
Matsubara et al.

(10) Patent No.: US 9,720,186 B2
(45) Date of Patent: Aug. 1, 2017

(54) OPTICAL CONNECTOR, OPTICAL TRANSMISSION MODULE, AND PLUG FOR OPTICAL CONNECTOR

(71) Applicants: KYOCERA CORPORATION, Kyoto (JP); KYOCERA CONNECTOR PRODUCTS CORPORATION, Kanagawa (JP)

(72) Inventors: Takahiro Matsubara, Kyoto (JP); Satoshi Asai, Kyoto (JP); Naoki Takahashi, Kanagawa (JP); Kazumi Nakazuru, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/085,748

(22) Filed: Mar. 30, 2016

(65) Prior Publication Data

US 2016/0216459 A1    Jul. 28, 2016

Related U.S. Application Data

(63) Continuation of application No. PCT/JP2014/075814, filed on Sep. 29, 2014.

(30) Foreign Application Priority Data

Sep. 30, 2013  (JP) ................. 2013-205230
Mar. 6, 2014   (JP) ................. 2014-043765

(51) Int. Cl.
*G02B 6/38* (2006.01)
*G02B 6/30* (2006.01)
*G02B 6/43* (2006.01)

(52) U.S. Cl.
CPC ......... *G02B 6/3882* (2013.01); *G02B 6/3865* (2013.01); *G02B 6/3885* (2013.01);
(Continued)

(58) Field of Classification Search
CPC .. G02B 6/3882; G02B 6/3885; G02B 6/3893; G02B 6/3865; G02B 6/3897; G02B 6/30; G02B 6/43
(Continued)

(56) References Cited

U.S. PATENT DOCUMENTS 4,762,388 A * 8/1988 Tanaka ................ G02B 6/3831
                                              385/58
6,442,306 B1 * 8/2002 Dautartas ............. G02B 6/32
                                              385/15
(Continued)

FOREIGN PATENT DOCUMENTS

JP    3-042107 U1    4/1991
JP    H07-199006 A  8/1995
(Continued)

OTHER PUBLICATIONS

International Search Report in International Patent Application No. PCT/JP2014/075814, dated Dec. 22, 2014 in 4 pages.

*Primary Examiner* — Ellen Kim
(74) *Attorney, Agent, or Firm* — Duane Morris LLP

(57) ABSTRACT

An optical connector has a receptacle which is fastened on a substrate provided with an optical waveguide, and a plug which holds an optical fiber and is positioned with respect to the receptacle. In the receptacle, an exposing opening for exposing an end face of the optical waveguide and a pin hole which opens in an opening direction of the exposing opening are provided. The plug has a facing surface facing the receptacle; a protruding part which protrudes from the facing surface, is formed integrally with the facing surface, exposes the an end face of the optical fiber on its front end face, and is inserted into the exposing opening; and the pin which is provided on the facing surface and is fitted in the
(Continued)

pin hole. The front end face of the protruding part is located further toward an insertion direction side than a front end of the pin.

16 Claims, 19 Drawing Sheets

(52) U.S. Cl.
CPC ......... *G02B 6/3893* (2013.01); *G02B 6/3897* (2013.01); *G02B 6/30* (2013.01); *G02B 6/43* (2013.01)

(58) Field of Classification Search
USPC ...................................... 385/53–63
See application file for complete search history.

(56) References Cited

U.S. PATENT DOCUMENTS

| | | | |
|---|---|---|---|
| 6,447,170 B1 | 9/2002 | Takahashi et al. | |
| 6,485,192 B1* | 11/2002 | Plotts | G02B 6/3825 385/71 |
| 9,052,474 B2* | 6/2015 | Jiang | G02B 6/3898 |
| 2012/0155802 A1* | 6/2012 | Hsu | G02B 6/4214 385/33 |
| 2014/0301700 A1 | 10/2014 | Matsubara et al. | |

FOREIGN PATENT DOCUMENTS

| | | |
|---|---|---|
| JP | H11-337770 A | 12/1999 |
| JP | 2001-15212 A | 1/2001 |
| JP | 2004-138883 A | 5/2004 |
| JP | 2011-075688 A | 4/2011 |
| JP | 2013-029624 | 2/2013 |
| JP | 2013-097064 | 5/2013 |
| WO | WO 2005/029147 A1 | 3/2005 |

\* cited by examiner

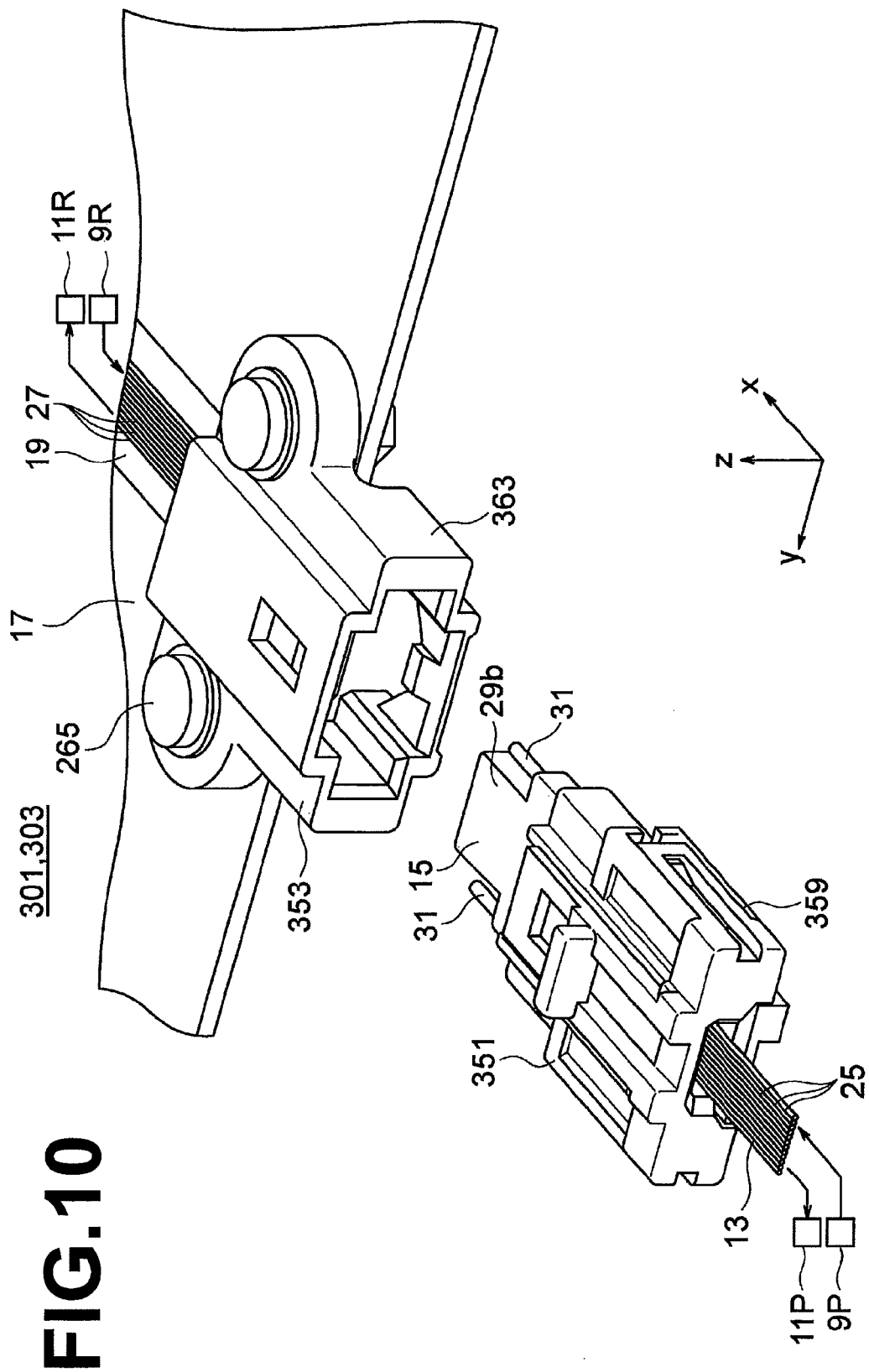

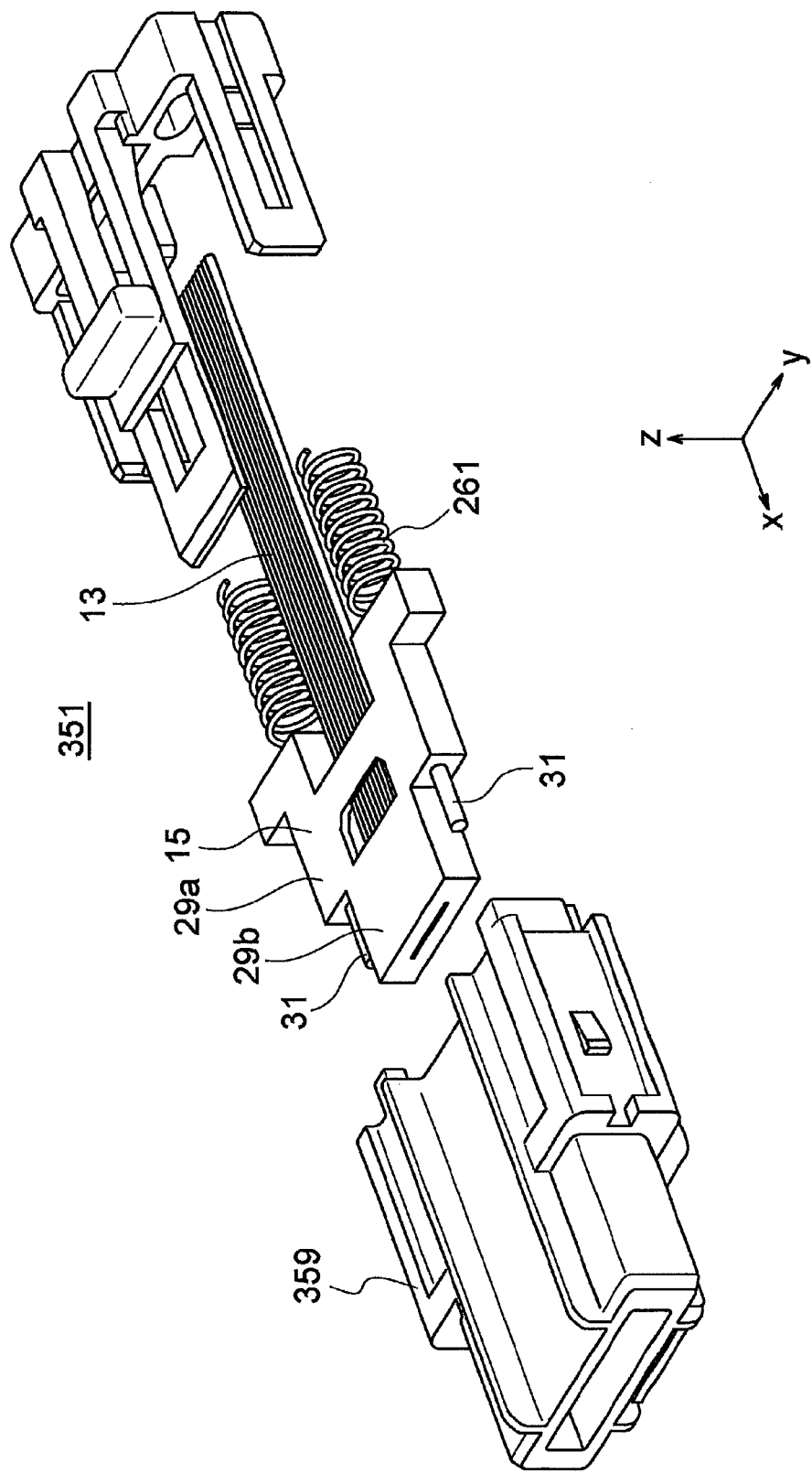

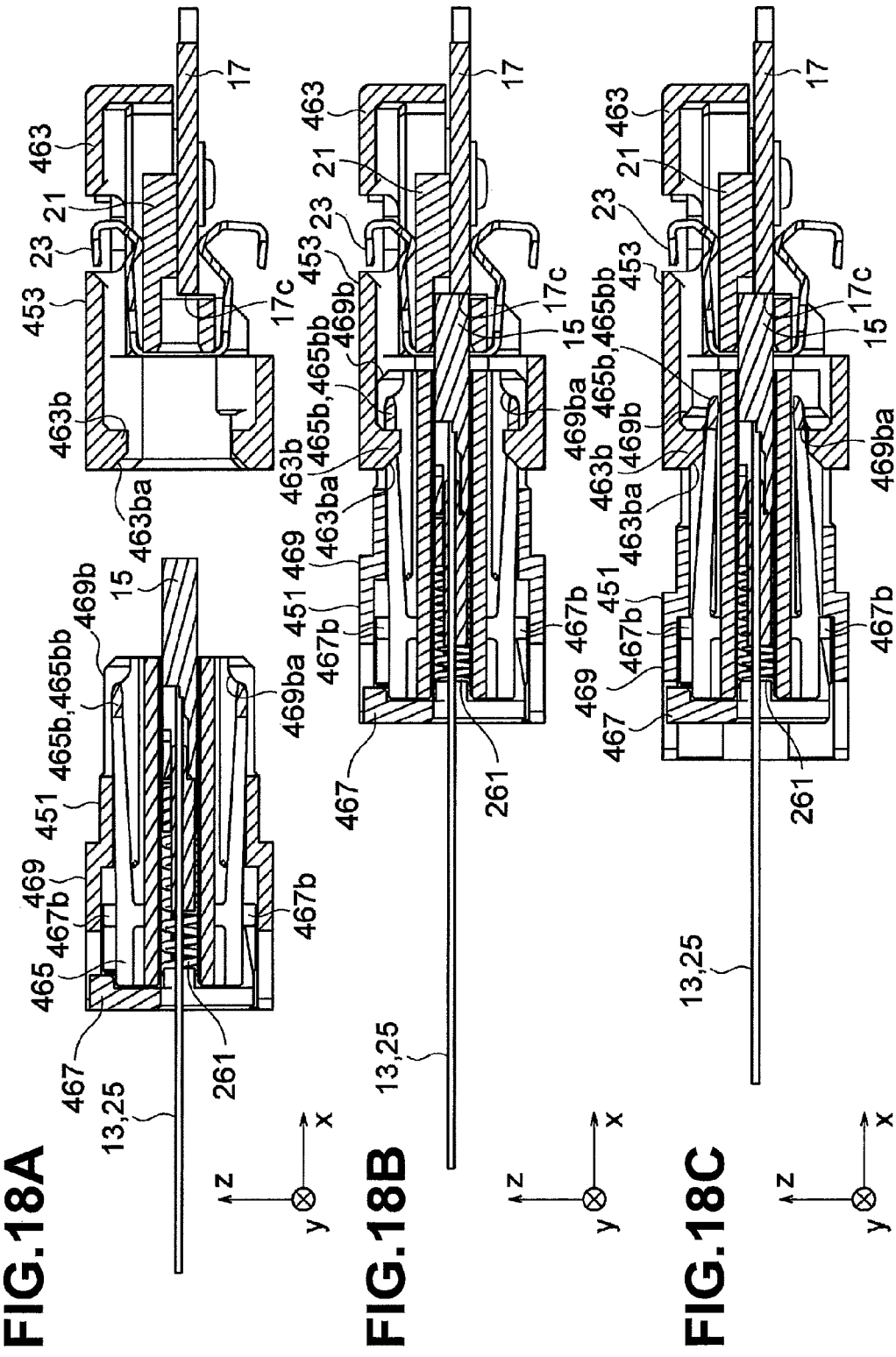

OPTICAL CONNECTOR, OPTICAL TRANSMISSION MODULE, AND PLUG FOR OPTICAL CONNECTOR

CROSS-REFERENCE TO RELATED APPLICATIONS

The present application is a continuation application to International Application No. PCT/JP2014/075814, filed Sep. 29, 2014 which claims priority to JP2013-205230, filed Sep. 30, 2013 and JP2014-043765, filed Mar. 6, 2014. The disclosures of these applications are incorporated herein by reference in their entirety.

TECHNICAL FIELD

The present invention relates to an optical connector for connecting optical transmission lines to each other, an optical transmission module having the optical connector, and a plug for the optical connector.

BACKGROUND ART

As an optical connector for connecting optical transmission lines to each other, ones of various forms have been proposed.

For example, the optical connectors in Patent Literature 1 and 3 have receptacles which are fastened to substrates provided with optical waveguides and plugs for holding optical fibers. Further, by fitting the plugs in the receptacles, the optical waveguides and the optical connectors are positioned (connected).

Further, for example, the optical connector in Patent Literature 2 has a first ferrule which is fastened onto the substrate provided with the optical waveguides and a second ferrule for holding the optical fibers. In the front end face of the first ferrule, engagement holes are formed. while alignment pins protrude from the front end face of the second ferrule. By fitting the alignment pins in the engagement holes, the optical waveguide and the optical connector are positioned (connected).

In the techniques of Patent Literature 1 and 3, basically the entire plug is fitted in the receptacle to connect the optical waveguide and the optical fiber. Accordingly, in order to realize high precision positioning, the entire plug must be formed with a high precision.

In the technique in Patent Literature 2, contact of any member with the alignment pins and so on causes an unforeseen external force to be applied to the alignment pins, so the alignment pins are liable to deform. As a result, high precision positioning is liable to become impossible. Further, in the technique in Patent Literature 2, the alignment pins and the engagement holes fit with each other on the substrate, therefore lowering of the profile is difficult.

Accordingly, it is desired to provide an optical connector, an optical transmission module, and a plug for optical connector capable of suitably positioning optical transmission lines relative to each other. For example, it is desired to solve at least one of the inconveniences described above.

CITATION LIST

Patent Literature

Patent Literature 1: Japanese Patent Publication No. 2013-097064A

Patent Literature 2: Japanese Patent Publication No. 2011-75688A

Patent Literature 3: Japanese Patent Publication No. 2013-029624A

SUMMARY OF INVENTION

An optical connector according to one aspect of the present invention has a receptacle which is fastened to a base provided with a first optical transmission line and a plug which holds a second optical transmission line and is positioned with respect to the receptacle. The receptacle is provided with an exposing opening for exposing an end face of the first optical transmission line and a hole for pin which opens in an opening direction of the exposing opening. The plug has a facing surface which faces the receptacle; a protruding part which protrudes from the facing surface, is integrally formed with the facing surface, exposes an end face of the second optical transmission line on its front end face, and is inserted into the exposing opening; and a pin which is provided on the facing surface and is fitted in the hole. The front end face of the protruding part is located further toward an insertion direction side than a front end of the pin.

An optical transmission module according to one aspect of the present invention has a substrate, a first optical transmission line which is provided on a major surface of the substrate and has an end face which is exposed at a side surface of the substrate, a second optical transmission line, a receptacle which is fastened to the substrate, and a plug which holds the second optical transmission line and is positioned relative to the receptacle. The receptacle is provided with an exposing opening for exposing the end face of the first optical transmission line and a hole for pin which opens in an opening direction of the exposing opening. The plug has a facing surface which faces the receptacle; a protruding part which protrudes from the facing surface, is integrally formed with the facing surface, exposes an end face of the second optical transmission line on its front end face, and is inserted into the exposing opening; and a pin which is provided on the facing surface and is fitted in the hole. The front end face of the protruding part is located further toward an insertion direction side than a front end of the pin.

A plug for an optical connector according to one aspect of the present invention is a plug for an optical connector, holding an optical transmission line and has a facing surface; a protruding part which protrudes from the facing surface, is integrally formed with the facing surface, and exposes an end face of the optical transmission line on its front end face; and a pin which is provided on the facing surface and protrudes in the same direction as the protruding part. The front end face of the protruding part is located further toward a protrusion direction side than a front end of the pin.

According to the above configurations, optical transmission lines can be suitably positioned relative to each other.

BRIEF DESCRIPTION OF DRAWINGS

FIG. 10 A perspective view showing an optical connector according to a third embodiment of the present invention in a non-connection state.

FIG. 11 A disassembled perspective view of the plug in the optical connector in FIG. 10.

FIG. 18A to FIG. 18C are cross-sectional views for explaining the mode of operation of the optical connector in FIG. 12 and correspond to the line XVIII-XVIII in FIG. 14A.

DESCRIPTION OF EMBODIMENTS

Figure 1A:
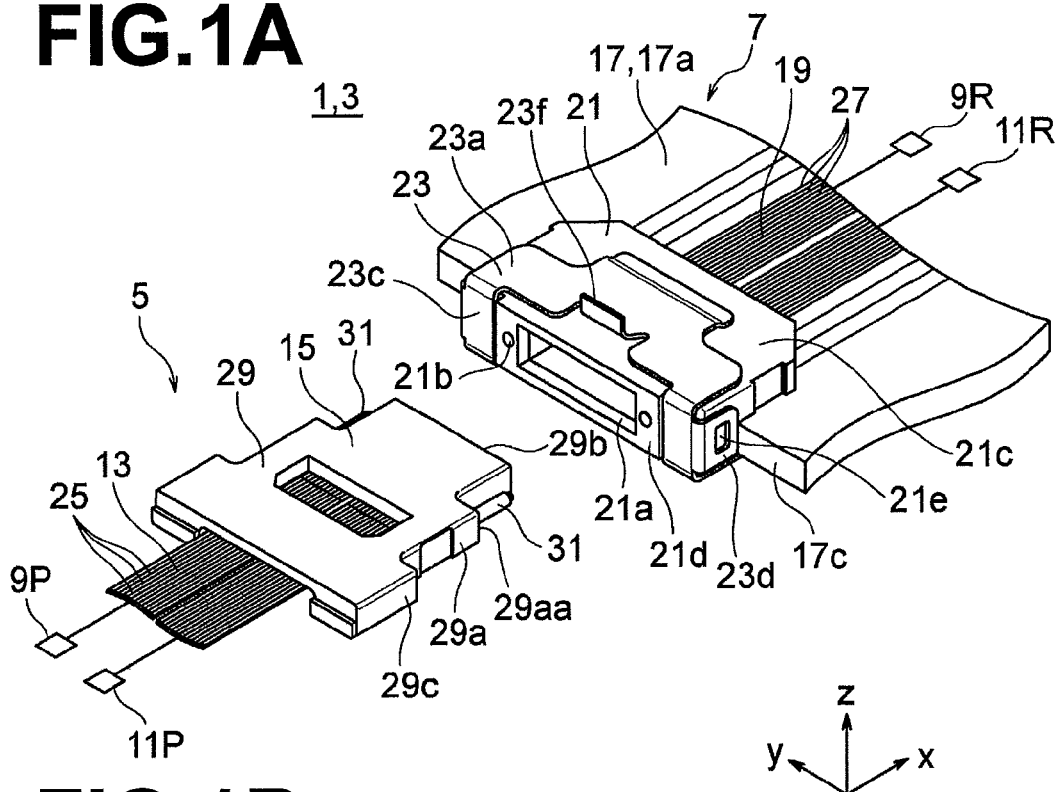
FIG. 1A and FIG. 1B are perspective views showing an optical connector according to a first embodiment of the present invention in a non-connection state.

Below, embodiments of the present invention will be explained with reference to the drawings. Note that, in the second and following embodiments, regarding the configurations which are the same as or similar to the configurations of the already explained embodiments, the same notations as the notations of the already explained embodiments will be assigned to them, and the explanation will be sometimes omitted. Further, even in a case where notations different from the notations attached to the configurations of the already explained embodiments are attached to configurations corresponding (similar) to the configurations of the already explained embodiments, the matters which are not particularly noted are the same as the matters which have been already explained for the corresponding configurations.

The optical connectors and optical transmission modules in the embodiments may be used with any direction defined as up or down. In the following description, when explaining the locational relationships etc., an orthogonal coordinate system (xyz) defined in the drawings will be sometimes referred to and the "upper surface" or other terms will be sometimes used while defining the positive side of the z-direction as the upside.

<First Embodiment>

Figure 1B:
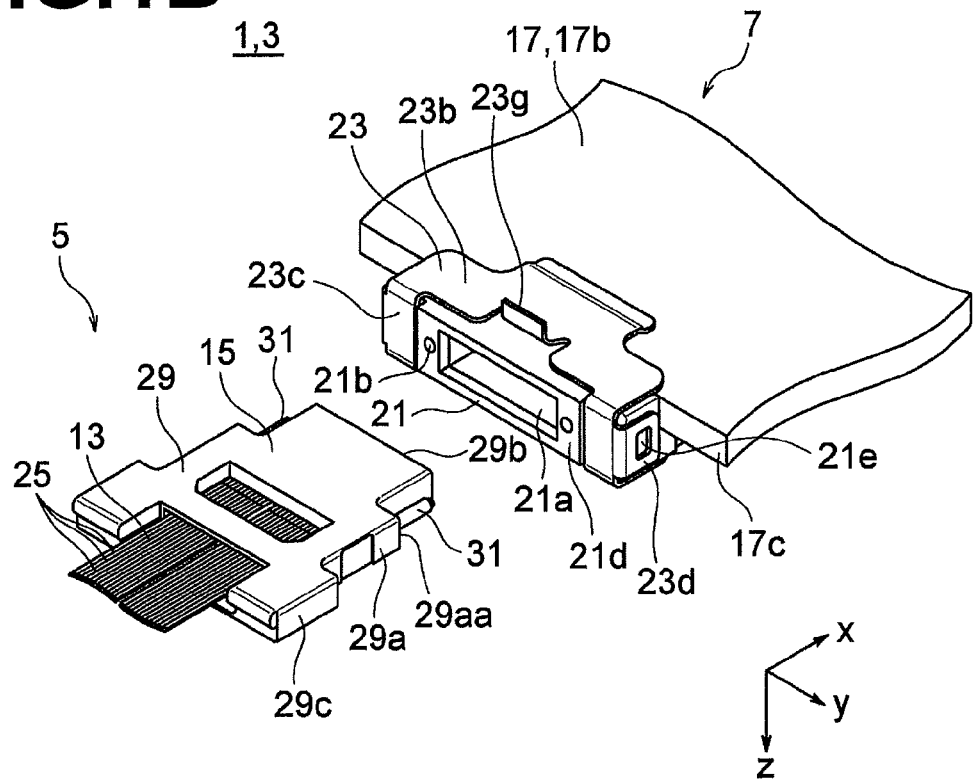
Figure 2:
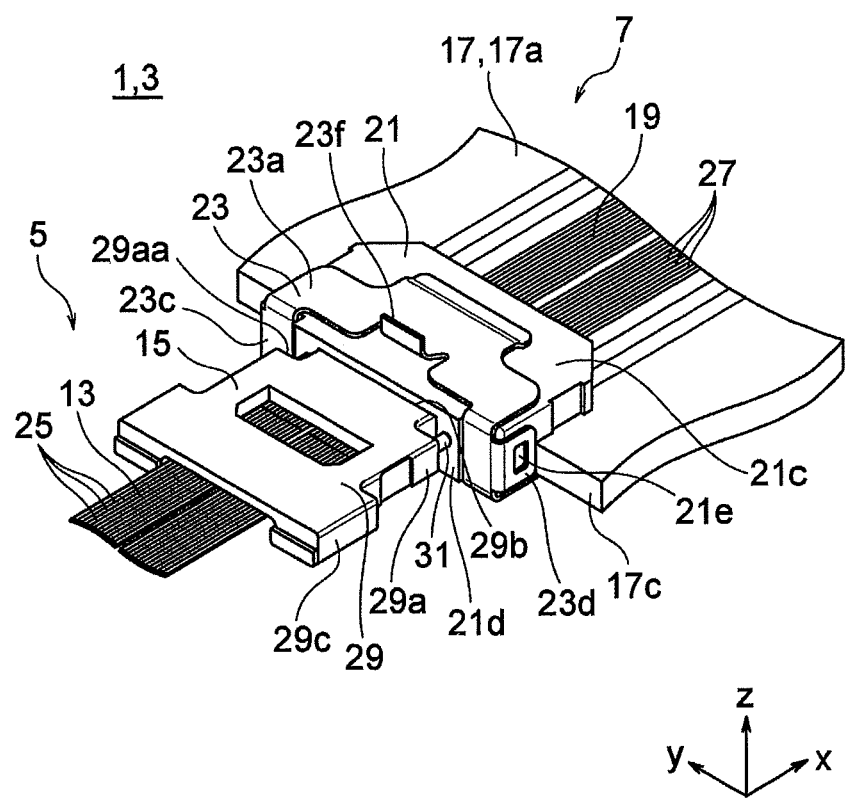
FIG. 2 A perspective view showing the optical connector in FIG. 1 in a connection state.

FIG. 1A, FIG. 1B, and FIG. 2 are perspective views showing the appearances of an optical connector 1 and optical transmission module 3 according to a first embodiment of the present invention. FIG. 1A shows a non-connection state from the positive side of the z-direction, FIG. 1B shows a non-connection state from the negative side of the z-direction, and FIG. 2 shows a connection state from the positive side of the z-direction.

The optical transmission module 3 has a plug assembly 5 and a receptacle assembly 7 which is optically connected to the plug assembly 5.

As shown in FIG. 1A, to the plug assembly 5, for example, a light emitting diode 9P and a light receiving diode 11P are connected. Further, to the receptacle assembly 7, for example, a light emitting diode 9R and light receiving diode 11R are connected. By the connection of the plug assembly 5 and the receptacle assembly 7, the light emitting diode 9P and the light receiving diode 11R are connected and the light emitting diode 9R and the light receiving diode 11P are connected. Note that, the optical transmission module 3 may be defined including these light emitting diodes and light receiving diodes as well.

The plug assembly 5 has an optical cable 13 and a plug 15 (plug ferrule) holding one end of the optical cable 13. Note that, the light emitting diode 9P and the light receiving diode 11P are directly or indirectly connected to one end of the optical cable 13 on the opposite side to the plug 15 side.

The receptacle assembly 7 has a substrate 17, an optical waveguide belt 19 which is provided on the substrate 17, a receptacle 21 (receptacle ferrule) which is provided on one end side of the optical waveguide belt 19, and a holder 23 for fastening the receptacle 21 to the substrate 17. Note that, the light emitting diode 9R and light receiving diode 11R are directly or indirectly connected to one end of the optical waveguide belt 19 on the opposite side to the receptacle 21 side.

By positioning the plug 15 by the receptacle 21, the optical cable 13 and the optical waveguide belt 19 are connected. Note that, the optical connector 1 includes the plug 15, receptacle 21, and holder 23. The concrete configurations of the members are as follows.

The optical cable 13 has a plurality of optical fibers 25. Each optical fiber 25, although not particularly shown, has a core and a cladding and has a coating film according to need. The diameter of the optical fiber 25 may be suitably set. For example, the diameter is 100 μm to 200 μm. Note that, the plurality of optical fibers 25 may be covered by a sheath and bundled at the outside of the plug 15 or may not be bundled. The plurality of optical fibers 25 are for example arranged aligned in the diameter direction in at least an internal portion of the plug 15.

The substrate 17 is for example configured by a rigid type printed circuit board. The substrate 17 is for example formed in a flat-plate shaped and has a first major surface 17a, a second major surface 17b on the back thereof, and a plurality of (usually four) side surfaces 17c which are located on the periphery of these major surfaces. Note that, the light emitting diode 9R and light receiving diode 11R may be mounted on the substrate 17 or may be provided separately from the substrate 17.

The optical waveguide belt 19 has a plurality of optical waveguides 27 which are provided on the first major surface 17a of the substrate 17. The optical waveguides 27, in the same way as the optical fibers, have not shown cores and claddings. Note that, the optical waveguides 27 may be slab types, embedded types, semi-embedded types, or other suitable types. The end faces of the optical waveguides 27 are exposed on the side surface 17c (see FIG. 3 and FIG. 4A). The plurality of optical waveguides 27, on at least the end face side on which they are exposed from the side surface 17c, are arranged in a line in the diameter direction and the direction along the side surface 17c (y-direction). Note that, the side surface 17c, in at least a range exposing the end faces of the optical waveguides 27, is formed in a straight line shape when viewing the substrate 17 by a plan view.

The plug 15 for example has a body part 29 holding the optical cable 13 and pins 31 protruding from the body part 29. On the other hand, in the receptacle 21, an exposing opening 21a for exposing the end faces of the optical waveguides 27 and pin holes 21b which open in the same direction as the opening direction of the exposing opening 21a are formed. Further, by insertion of the body part 29 into the exposing opening 21a and insertion of the pins 31 into the pin holes 21b, the plug 15 is positioned relative to the receptacle 21 and consequently the optical cable 13 and the optical waveguides 27 are connected. Specifically, this is as follows.

The body part 29 is for example formed by a resin. Further, the body part 29 is for example formed to a thin shape having roughly the same thickness as a whole. The size of the external form thereof when viewed by a plan view is for example a few mm to 2 cm on one side. The body part 29 has a base part 29a, a protruding part 29b which protrudes from the front surface of the base part 29a (facing surface 29aa facing the receptacle 21), and locked portions 29c which protrude from the side surfaces of the base part 29a.

The base part 29a is for example formed to a roughly thin cuboid. The protruding part 29b is for example formed to a roughly thin cuboid having a smaller width (y-direction) than the base part 29a and protrudes from the center of the facing surface 29aa. The locked portions 29c are for example formed to thin cuboids having smaller lengths (x-direction) than the base part 29a and protrude from the rear side portions of the side surfaces of the base part 29a.

Figure 3A:
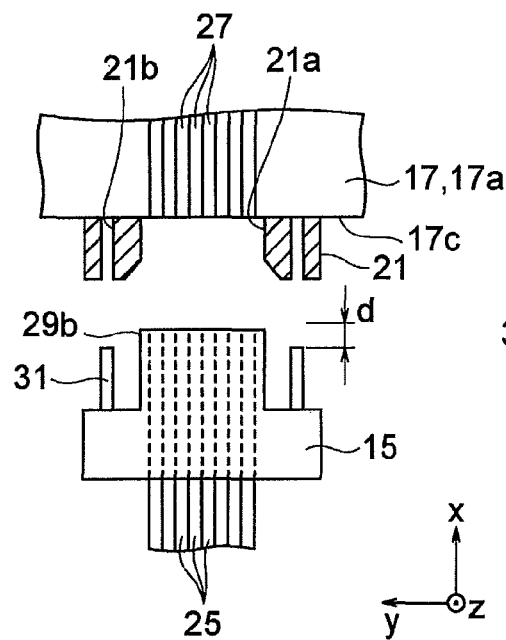
FIG. 3A to FIG. 3D are schematic plan views for explaining a situation where the optical connector in FIG. 1 is connected.
Figure 3B:
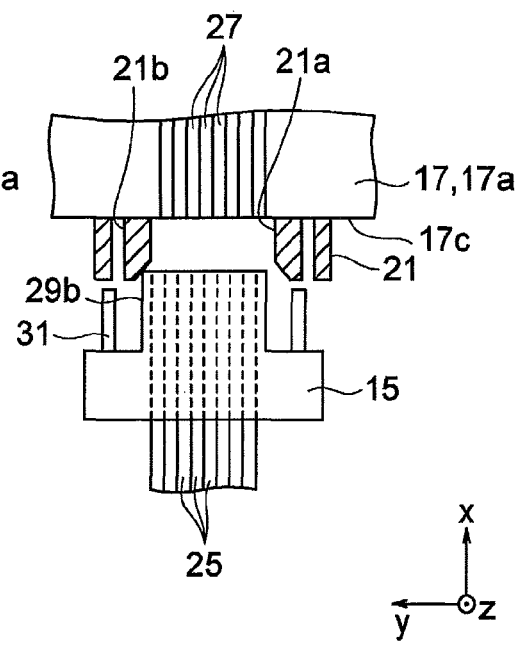
Figure 3C:
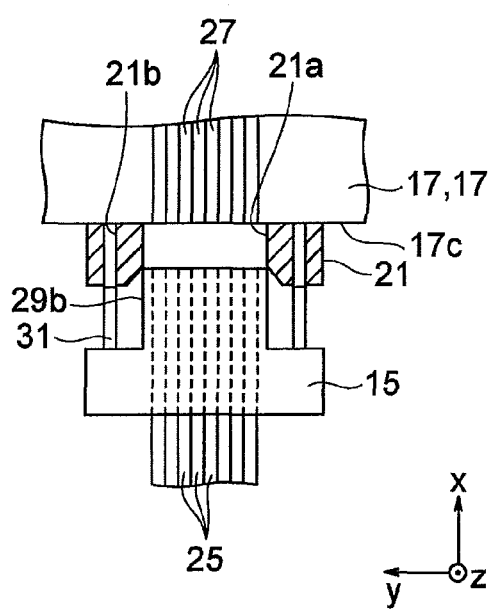
Figure 3D:
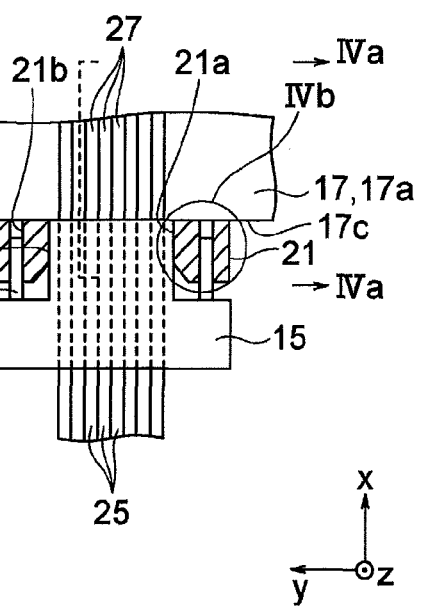
Figure 4A:
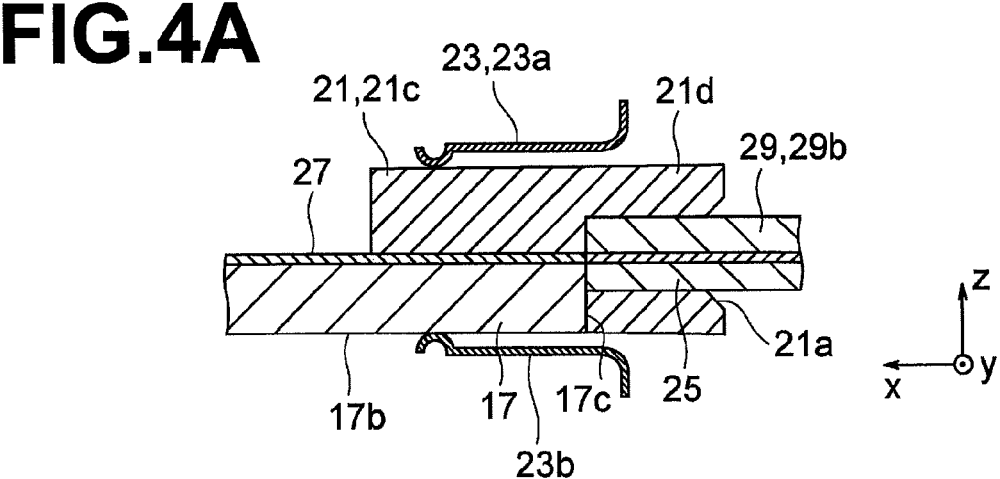
FIG. 4A is a cross-sectional view taken along the line IVa-IVa in FIG. 3D.

The optical fibers 25 are inserted into the base part 29a and protruding part 29b in the insertion direction (x-direction) into the receptacle 21, and the end faces thereof are exposed at the front end face of the protruding part 29b (see FIG. 3 and FIG. 4A). The front end face of the protruding part 29b is formed in a flat shape, and the end faces of the optical fibers 25 are arranged in a line in the y-direction. Further, when the protruding part 29b is inserted into the exposing opening 21a of the receptacle 21 and the front end face of the protruding part 29b abuts against the side surface 17c of the substrate 17, the optical fibers 25 and the optical waveguides 27 are connected. The locked portions 29c are portions contributing to the engagement with other members in other embodiments which will be explained later and may be omitted in the present embodiment as well.

The pins 31 are for example formed by a metal. The pins 31, for example, have circular cross-sectional shapes and extend in straight line shapes. Note that, the pins 31 may have a constant diameter from the base to the front end or may be made thinner at the front ends. The pins 31 protrude from the facing surface 29aa of the base part 29a in the same direction as the protrusion direction of the protruding part 29b. Further, two pins 31 are provided so as to sandwich the protruding part 29b therebetween in the direction of arrangement of the optical fibers 25. The front ends of the pins 31 are located nearer the base side (the opposite side to the insertion direction) than the front end face of the protruding part 29b.

The body part 29 is for example roughly integrally formed as a whole by filling a molten resin in a mold in which the pins 31 are arranged. Accordingly, the base part 29a (at least a portion including the facing surface 29aa) and protruding part 29b are integrally formed.

Note that, the body part 29 may be configured by a plurality of members. For example, the rear part of the body part 29 may be formed by a member different from that for the protruding part 29b and the front part of the base part 29a as well. Further, for example, the body part 29 may be configured by including two members which are bonded to each other in a state where the pins 31 and/or optical fibers 25 are nipped in the z-direction as well. Note that, also in this case, the front part of the base part 29a and the protruding part 29b are integrally formed on the positive side and/or negative side of the z-direction of the optical fibers 25.

The receptacle 21, for example, is integrally formed by a resin as a whole. Note, the receptacle 21 may be configured by bonding a plurality of members as well. The receptacle 21 has an extension portion 21c which is located on the first major surface 17a of the substrate 17 and a front surface portion 21d which is located on the plug 15 side relative to the side surface 17c of the substrate 17 and faces the plug 15.

The extension portion 21c is the portion contributing to the positioning etc. of the receptacle 21 with respect to the substrate 17. The extension portion 21c is for example formed in a roughly plate shape superimposed on the first major surface 17a. By superimposing the extension portion 21c on the first major surface 17a, positioning of the receptacle 21 in the z-direction with respect to the substrate 17 is carried out.

Further, although not particularly shown, for example, by formation of a concave groove extending in the x-direction in the surface of the extension portion 21c which is on the first major surface 17a side and by formation of a protruding part on the first major surface 17a which is fitted in the y-direction with respect to the concave groove, the receptacle 21 is positioned in the y-direction. Note that, the protruding part may be formed by a resin, metal, ceramic, or another suitable material. Further, the protruding part may be fastened to the substrate 17 by a suitable method such as an adhesive or welding.

The front surface portion 21d is formed in a roughly frame shape as a whole. Its opening configures the exposing opening 21a. Further, in the front surface portion 21d, pin holes 21b are formed as well. The rear end surface of the front surface portion 21d abuts against the side surface 17c of the substrate 17. Due to this, the receptacle 21 is positioned in the x-direction.

The exposing opening 21a passes through the front surface portion 21d in the x-direction and exposes the end faces of the optical waveguides 27 located at the side surface 17c to the outside of the receptacle 21. The cross-sectional shape of the exposing opening 21a corresponds to the cross-sectional shape of the protruding part 29b of the plug 15 and is rectangular in the present embodiment. The opening end on the plug 15 side of the exposing opening 21a further expands in diameter toward the plug 15 side (an inclined surface is formed) so that the protruding part 29b is easily inserted.

The cross-sectional shape of the pin holes 21b corresponds to the cross-sectional shape of the pins 31 of the plug 15 and is circular in the present embodiment. It is sufficient that the pin holes 21b have a depth capable of accommodating the pins 31. In the present embodiment, the pin holes 21b penetrate through the front surface portion 21d in the x-direction.

The holder 23 is formed by press working a single metal sheet and fastens the receptacle 21 with respect to the substrate 17 by nipping the substrate 17 and receptacle 21 by its restoring force. Specifically, this is as follows.

The holder 23 has a first abutting portion 23a which abuts against the upper surface of the receptacle 21 (the surface of the extension portion 21c on the opposite side to the substrate 17, i.e. the surface on the positive side of z-direction), a second abutting portion 23b which abuts against the second major surface 17b of the substrate 17, and coupling parts 23c which couple them.

The schematic shape of the first abutting portion 23a is for example a plate shape superimposed on the upper surface of the receptacle 21. Further, for example, on the end part of the first abutting portion 23a which is on the opposite side to the coupling parts 23c, a protruding part protruding to the receptacle 21 side is formed and abuts against the receptacle 21. Due to this, in the first abutting portion 23a, a contact position with respect to the receptacle 21 is made constant.

The schematic shape of the second abutting portion 23b is for example a plate shape superimposed on the second major surface 17b of the substrate 17. Further, for example, on the end part of the second abutting portion 23b which is on the opposite side to the coupling parts 23c, a protruding part protruding to the substrate 17 side is formed and abuts against the substrate 17. Due to this, in the second abutting portion 23b, a contact position with respect to the substrate 17 is made constant.

The schematic shape of the coupling parts 23c is for example a plate shape superimposed on the outside portion of the exposing opening 21a and pin holes 21b in the front surface (surface on the plug 15 side) of the front surface portion 21d of the receptacle 21. Note that, on the front surface of the front surface portion 21d, the portions on which the coupling parts 23c are superimposed are made lower (located on the positive side of the x-direction) than the portions in which the exposing opening 21a and pin holes 21b are formed. The steps thereof contribute to the positioning of the coupling parts 23c in the y-direction.

In the holder 23, in a state where elastic deformation is not caused, a distance between (the protruding part at the end part of) the first abutting portion 23a and (the protruding part at the end part of) the second abutting portion 23b is shorter than the distance between the upper surface of the receptacle 21 and the second major surface 17b of the substrate 17. Accordingly, when the receptacle 21 and substrate 17 are nipped by the first abutting portion 23a and the second abutting portion 23b, the holder 23 exhibits a resiliently deformed state and generates a restoring force. By this restoring force, the receptacle 21 is biased to the substrate 17 side, and detachment of the receptacle 21 from the substrate 17 is suppressed.

Further, the holder 23 has engagement parts 23d which are engaged with the receptacle 21. The engagement parts 23d for example extend from the coupling parts 23c to the positive side of the x-direction along the side surface of the front surface portion 21d. Further, in the engagement parts 23d, hole portions which are engaged with hook portions 21e formed at the side surfaces of the front surface portion 21d are formed. By engagement of the engagement parts 23d with respect to the hook portions 21e of the front surface portion 21d from the positive side to the negative side of the x-direction, detachment of the holder 23 to the negative side of the x-direction is suppressed.

Further, the holder 23 has a first protruding part 23f which protrudes from the first abutting portion 23a to the side opposite to the receptacle 21 (positive side of the z-direction) and a second protruding part 23g which protrudes from the second abutting portion 23b to the side opposite to the substrate 17 (negative side of the z-direction). They are portions contributing to the engagement with other members in the embodiments which will be explained later and may be omitted in the present embodiment as well.

Note that, in the present embodiment, the holder 23 exhibits a symmetric shape in the z-direction and any side of it may be either the receptacle 21 side or substrate 17 side. Note, the holder 23 may be made asymmetric in the z-direction as well.

FIG. 3A to FIG. 3D are schematic plan views for explaining a situation of insertion of the plug 15 into the receptacle 21. Note, for the receptacle 21, a cross-sectional view at the position of the first major surface 17a is shown. Further, FIG. 4A is a cross-sectional view taken along the line IVa-IVa in FIG. 3D.

FIG. 3A shows a state before the plug 15 is inserted into the receptacle 21. As already explained, in the plug 15, the front end face of the protruding part 29b is located further toward the insertion direction side (positive side of the x-direction) than the front ends of the pins 31. Further, the opening end on the plug 15 side of the exposing opening 21a and the opening ends on the plug 15 side of the pin holes 21b are located at the same position.

Accordingly, as shown in FIG. 3B, when making the plug 15 approach the receptacle 21, first, insertion of the protruding part 29b into the exposing opening 21a is started. At this time, because an inclined surface that further expands in diameter toward the plug 15 side is formed in the portion of the exposing opening 21a on the plug 15 side, the plug 15 is guided into the exposing opening 21a and smoothly inserted even when the plug 15 and the receptacle 21 are deviated in the y-direction or z-direction. That is, the deviation of the plug 15 and the receptacle 21 in the y-direction and z-direction is eliminated.

Further, as shown in FIG. 3C, the protruding part 29b reaches the portion having the constant diameter in the exposing opening 21a. That is, clearance between the protruding part 29b and the exposing opening 21a is contained within a predetermined range. At roughly the same time as this or after this, insertion of the pins 31 into the pin holes 21b is started. Note that, the distance "d" (FIG. 3A) between the front end face of the protruding part 29b and the front ends of the pins 31 is suitably set so that such an action is obtained.

After that, as shown in FIG. 3D and FIG. 4A, the front end face of the protruding part 29b abuts against the side surface 17c of the substrate 17. Further, by fitting the pins 31 in the pin holes 21b, the plug 15 and the receptacle 21 are positioned in the y-direction and z-direction. Due to this, the end faces of the optical fibers 25 and the end faces of the optical waveguides 27 are brought to a facing state (including abutting state) and are optically connected.

Figure 4B:
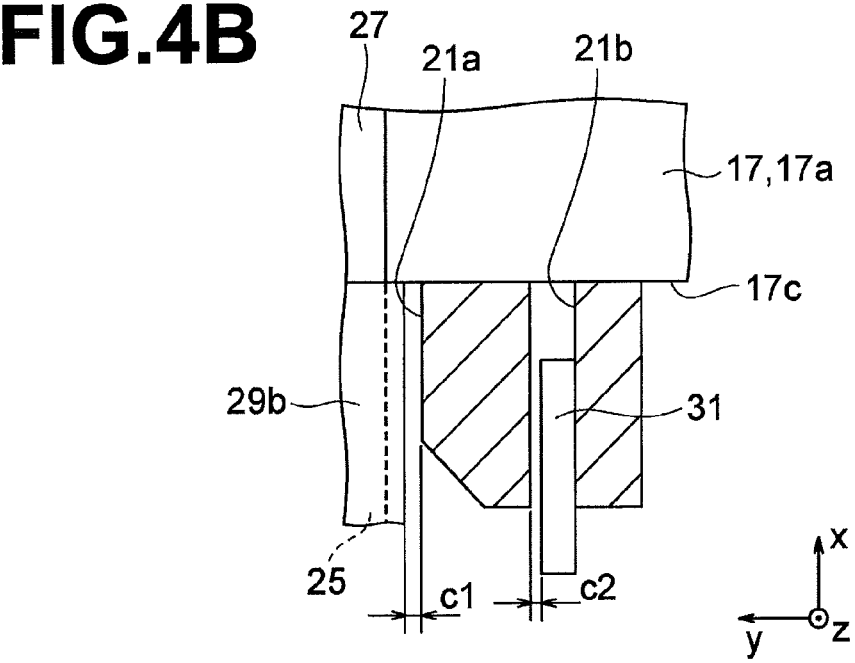
FIG. 4B is a schematic view showing a region IVb in FIG. 3D enlarged.

FIG. 4B is a schematic view showing a region IVb in FIG. 3D enlarged.

The diameter of the pins 31 and the diameter of the pin holes 21b are designed taking manufacturing error into account. For this reason, in order to make it possible to insert the pins 31 into the pin holes 21b even if variation arises due to precision in production, the diameter of the pins 31 is designed to be smaller than the diameter of the pin holes 21b by a difference which is equal to the precision in production or larger than this. Accordingly, a clearance c2 is generated between the pins 31 and the inner circumferential surfaces of the pin holes 21b. The clearance c2 is for example about 1 μm in a design value where it is defined as a difference between the diameter of the pins 31 and the diameter of the pin holes 21b.

On the other hand, a clearance c1 is generated also between the protruding part 29b and the inner circumferential surface of the exposing opening 21a. This clearance c1 is intentionally made larger than the clearance c2. Accordingly, in the optical connector 1, in the end, the positioning is carried out by the pins 31 and the pin holes 21b. The protruding part 29b and the exposing opening 21a play a role supporting this positioning. If the clearance c1 is defined as the difference between the diameter of the protruding part 29b in the y-direction (or z-direction) and the diameter of the exposing opening 21a in the y-direction (or z-direction), for example, the clearance c1 is about 50 μm in design value in contrast to the clearance c2 of about 1 μm in design value.

In this way, in the end, the positioning is carried out by the pins 31 and the pin holes 21b, therefore the precision in production of the protruding part 29b and the exposing opening 21a can be made looser compared with the precision in production of the pins 31 and the pin holes 21b. For example, in contrast to the tolerance in production of the pins 31 and the pin holes 21b being 1 μm or less, the tolerance in production of the protruding part 29b and the exposing opening 21a is less than 50 μm.

Figure 4C:
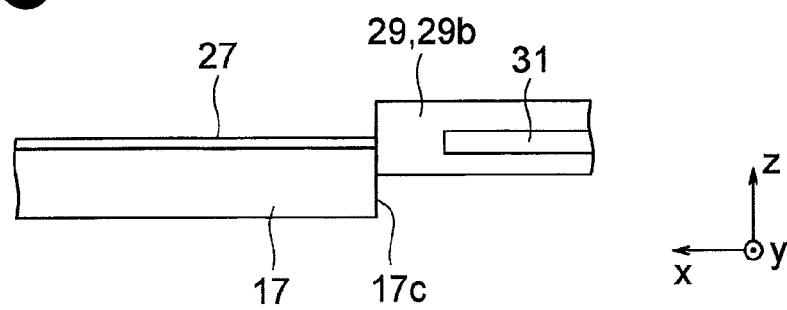
FIG. 4C is a side view of the same range as FIG. 4A.

FIG. 4C is a side surface view of the same range as FIG. 4A. Note, the illustration of the receptacle 21 is omitted.

The pins 31 are located on lateral sides (y-direction) of the protruding part 29b and are contained within the range of the thickness of the protruding part 29b. Further, in the z-direction, the pins 31 are for example located near the optical fibers 25, and at least portions thereof are contained within the range of the thickness of the substrate 17 (including the optical waveguides 27). That is, when viewed in the insertion direction, the pins 31 (pin holes 21b) and the substrate 17 are at least partially superimposed on each other.

As described above, according to the present embodiment, the optical connector 1 has the receptacle 21 which is fastened on the substrate 17 provided with the optical waveguides 27, and the plug 15 which holds the optical fibers 25 and is positioned with respect to the receptacle 21. In the receptacle 21, the exposing opening 21a for exposing the end faces of the optical waveguides 27 and the pin holes 21b which open in the opening direction of the exposing opening 21a are provided. The plug 15 has the facing surface 29aa facing the receptacle 21; the protruding part 29b which protrudes from the facing surface 29aa, is formed integrally with the facing surface 29aa, exposes the end faces of the optical fibers 25 on the front end face, and is inserted into the exposing opening 21a; and the pins 31 which are provided on the facing surface 29aa and are fitted in the pin holes 21b. The front end face of the protruding part 29b is located further toward the insertion direction side than the front ends of the pins 31.

Accordingly, the positioning is possible by the pins 31, therefore the portion which must be molded or machined with a high precision can be made smaller compared with the case where the entire plug is fitted in the receptacle as in Patent Literature 1. As a result, easy high precision positioning becomes possible.

On the other hand, the pins 31 do not protrude more than the protruding part 29b, therefore contact of any member with the pins 31 is suppressed by the protruding part 29b and consequently the possibility of deformation in the pins 31 is reduced. As a result, stable high precision positioning is possible.

Further, since the protruding part 29b holding the optical fibers 25 is provided so as to protrude more than the pins 31, the connection position of the optical fibers 25 and the optical waveguides 27 is located in front of the pins 31 (positive side of the x-direction). That is, the pins 31 are located before the side surface 17c of the substrate 17 (on negative side of the x-direction than the latter). Accordingly, it is not necessary to arrange the pins 31 so that the pins 31 are located on the substrate 17 as in Patent Literature 2. As a result, the degree of freedom of design of the pins 31 is improved. For example, a reduction in profile of the plug 15 can be expected.

From another viewpoint, the front end face of the protruding part 29b is located further toward the insertion direction side than the front ends of the pins 31, therefore the abutting of the front end face of the protruding part 29b and the side surface 17c of the substrate 17 is not obstructed by the abutting of the pins 31 and the side surface 17c. That is, the front end face of the protruding part 29b can be reliably made to abut against the side surface 17c of the substrate 17. As a result, for example, the end faces of the optical fibers 25 which are exposed on the front end face of the protruding part 29b and the end faces of the optical waveguides 27 which are exposed on the side surface 17c of the substrate 17 are made to abut against each other and can be reliably optically connected.

Further, in the present embodiment, after the insertion of the protruding part 29b into the exposing opening 21a progresses and the clearance between the two becomes smaller down to a predetermined size, the insertion of the pins 31 into the pin holes 21b is started (FIG. 3B to FIG. 3D).

That is, the pins 31 start to be inserted into the pin holes 21b after the positioning in the directions (y-direction and z-direction) perpendicular to the insertion direction is carried out to a certain extent by the protruding part 29b and exposing opening 21a. Accordingly, the pins 31 are smoothly inserted into the pin holes 21b. As a result, the work efficiency is improved. Further, the possibility of deformation due to the pins 31 abutting against the front surface of the receptacle 21 is reduced. By reduction of the possibility of deformation, high precision positioning is stably carried out.

Further, in the present embodiment, the clearance c2 between the pins 31 and the pin holes 21b is smaller than the clearance c1 between the protruding part 29b and the exposing opening 21a.

Accordingly, in the end, the positioning is carried out by the pins 31 and the pin holes 21b, while the protruding part 29b and exposing opening 21a contribute to the protection of the pins 31 and support of positioning and so on as explained above. Further, the amount of sliding of the protruding part 29b with respect to the exposing opening 21a is reduced. Therefore resistance against the connection of the plug 15 to the receptacle 21 (frictional resistance) is reduced and the work efficiency is improved, and formation of scum on the inner surface of the protruding part 29b or exposing opening 21a is suppressed. Further, as explained above, in the case where the pins 31 are inserted into the pin holes 21b after the clearance between the protruding part 29b and the exposing opening 21a becomes smaller down to a predetermined size, after primary guidance with a rough precision of fitting, secondary guidance with a high precision of fitting is carried out. For this reason, the insertion of the protruding part 29b into the exposing opening 21a and the insertion of the pins 31 into the pin holes 21b after this are carried out more smoothly compared with the case where the pins 31 are inserted into the pin holes 21b from the start and, finally, high precision positioning is carried out by the pins 31 and pin holes 21b. That is, the positioning is smoothly and high precisely carried out as a whole.

Further, in the present embodiment, two or more pins 31 are provided, and the protruding part 29b is arranged between the two pins 31.

Accordingly, the optical fibers 25 held by the protruding part 29b are positioned with a high precision by the pins 31 being located at the two sides. Further, even if a member contacts one pin 31 from the opposite side to the protruding part 29b, the other pin 31 is protected by the protruding part 29b. As a result, the effect of deformation of one pin 31 exerted upon the positioning by the plurality of pins 31 is mitigated.

Further, in the present embodiment, the protruding part 29b holds two or more optical fibers 25 in the state aligned in the diameter direction, and the protruding part 29b and the pins 31 are arranged aligned in the direction of arrangement of those two or more optical fibers 25.

Accordingly, the plug 15 can be made smaller in size (width in the z-direction) in the direction perpendicular to the direction of arrangement of two or more optical fibers 25. That is, thinning or lowering of the profile of the plug 15 is possible.

Further, in the present embodiment, the optical connector 1 further has the holder 23 which is configured by a single folded metal sheet and nips the receptacle 21 and the substrate 17 in the direction superimposing them according to the restoring force.

Accordingly, it is not necessary to use an adhesive, so attachment/detachment (exchange) of the receptacle 21 with respect to the substrate 17 is easy. Further, compared with bolts and nuts, reduction of the number of parts, simplification of the configuration, and facilitation of application to small-sized receptacles 21 can be expected.

Further, in the present embodiment, the protruding part 29b is formed by a resin, and the pins 31 are formed by a metal.

Accordingly, the strength of the pins 31 is secured while reducing the price as a whole, and stable high precise positioning is possible.

<Second Embodiment>

Figure 5:
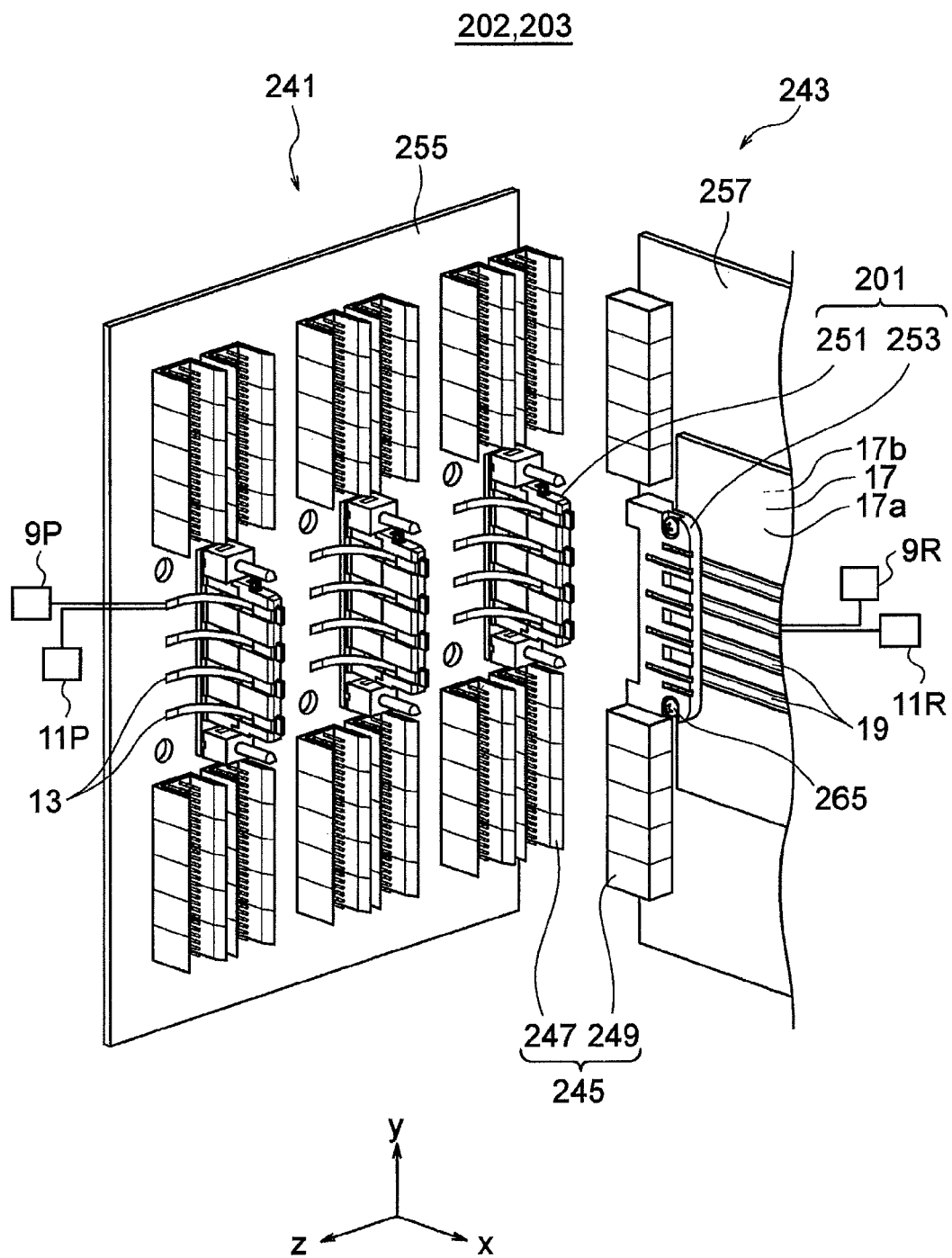
FIG. 5 A perspective view showing an optical connector according to a second embodiment of the present invention in a non-connection state.
Figure 6:
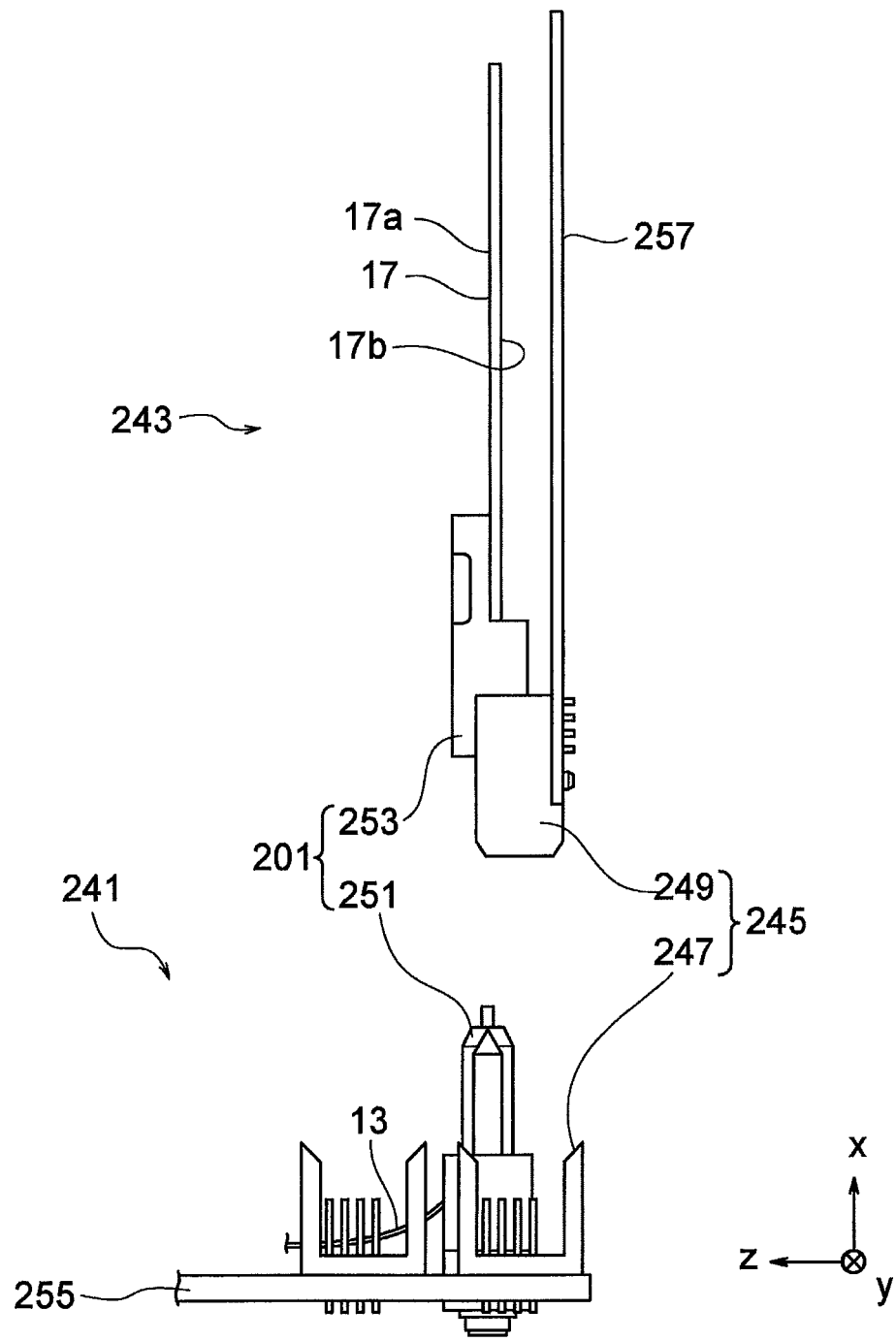
FIG. 6 A diagram seeing a portion in FIG. 5 in a y-direction.

FIG. 5 is a perspective view showing an optical connector 201 and an optoelectric composite transmission module 202 (optical transmission module 203) according to a second embodiment of the present invention in a non-connection state. Further, FIG. 6 is a view showing a portion in FIG. 5 in the y-direction.

The optical connector 201 includes the optical connector 1 in the first embodiment as a portion thereof, while the optoelectric composite transmission module 202 (optical transmission module 203) includes the optical transmission module 3 in the first embodiment as a portion thereof. Note that, the second embodiment may be grasped as an example of application of the first embodiment as well.

The optoelectric composite module including the optoelectric composite transmission module 202 is configured by a structural body formed by connecting a plurality of substrate assemblies configured by providing electronic parts etc. on the substrates. The mutual signal transmission among the substrate assemblies is carried out by electrical signals and optical signals. Such an optoelectric composite module configures for example a computer system.

The "optoelectric composite transmission module 202" means the configuration in the optoelectric composite module which is concerned with signal transmission. The optical transmission module 203, in a narrow sense, means the configuration in the optoelectric composite transmission module 202 which is concerned with the transmission of optical signals. Note, the optical transmission module 203 may be defined including the configuration concerned with the transmission of electrical signals as well. In the following description, according to the latter definition, the term of the "optical transmission module 203" will be used.

The optical transmission module 203 has, as substrate assemblies, a midplane assembly 241 and a plurality of (only one is shown in FIG. 1) blade assemblies 243 which are vertically connected with respect to the midplane assembly 241. Further, the midplane assembly 241 and the blade assemblies 243 are connected by electrical connectors 245 connecting the transmission lines of electricity to each other and optical connectors 201, for connecting the light transmission lines to each other.

The midplane assembly 241 has a midplane 255, electric plugs 247 which are provided on the major surface of the midplane 255 and configure the electrical connectors 245, optical plugs 251 which are provided on the major surface of the midplane 255 and configures the optical connectors 201, and a plurality of (four in the present embodiment) optical cables 13 which are held upon the optical plugs 251. Note that, the midplane assembly is called also the "back plane assembly" according to the attachment position in the computer system. There is basically no large difference between the functions of the two.

Further, the blade assembly 243 has a blade 257, the substrate 17 which is fastened to the blade 257 in a stacked manner, an electric receptacle 249 which is provided on the blade 257 and configures an electrical connector 245, and an optical receptacle 253 which is provided on the substrate 17 and configures an optical connector 201. The substrate 17 is provided with a plurality of optical waveguide belts 19 which are optically connected to the plurality of optical cables 13.

Note that, although not particularly shown, ICs or other electronic parts (including photo-electric conversion elements) are mounted on the blade 257. The electronic parts such as ICs may be mounted on the midplane 255 and substrate 17 as well. The light emitting diode 9P and light receiving diode 11P which are directly or indirectly connected to the optical cables 13 may be provided on the midplane 255 or may be provided separately from the midplane 255. The light emitting diode 9R and light receiving diode 11R which are directly or indirectly connected to the optical waveguide belts 19 may be provided on either of the blade 257 or substrate 17 and may be provided separately from them.

The electric plug 247 is provided on the major surface of the midplane 255. On the other hand, each electric receptacle 249 is provided at the end part of the blade 257. In a state where the blade 257 is given an orientation vertical to the major surface of the midplane 255, a plurality of pin shaped terminals of the electric plug 247 are inserted and fitted with respect to a not shown plurality of hole portions (terminals are arranged in the internal portions) of the electric receptacle 249 in the direction (x-direction) along the blade 257. Due to this, mechanical connection and electrical connection are carried out.

The substrate 17 is provided as so-called mezzanine board, is arranged in a stacked manner to a blade 257, and is fastened with respect to the blade 257 by screws etc. The signal transmission between the substrate 17 and the blade 257 is carried out by light and/or electricity. That electrical or optical connection may be carried out for example in the same way as the known method. For example, the optical connection between the substrate 17 and the blade 257 may be carried out by optical cables which are connected through a known optical connector to these substrates.

The optical plug 251 is provided on the major surface of the midplane 255 so that the direction perpendicular to the major surface of the midplane 255 is the insertion direction. On the other hand, The optical receptacle 253 is provided at the end part of the substrate 17 so that the direction along the first major surface 17a of the substrate 17 is the insertion direction. Further, when inserting the electrical plug 247 into the electrical receptacle 259 as explained above, the optical plug 251 is also inserted with respect to the optical receptacle 253 and is fitted there. Due to this, the optical cables 13 and the optical waveguide belts 19 are optically connected.

Figure 7:
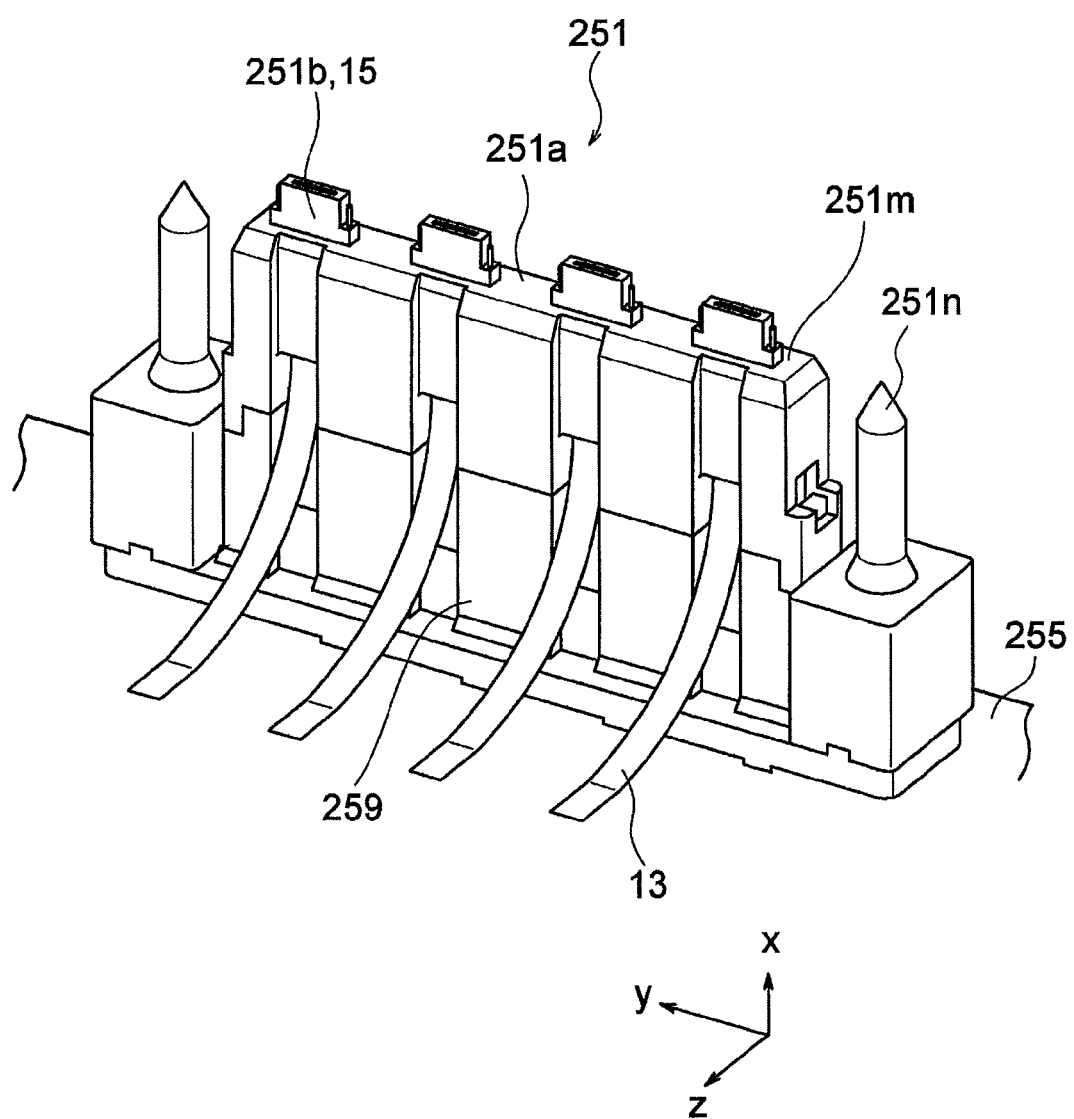
FIG. 7 A perspective view showing a plug of the optical connector in FIG. 5.

FIG. 7 is a perspective view showing an optical plug 251.

The optical plug 251 has a body part 251m for holding the optical cables 13 and posts 251n which are provided parallel to the body part 251m. These are all inserted into hole portions (explained later) of an optical receptacle 253 and are utilized for positioning (connection) the optical cables 13 and the optical waveguide belts 19.

The body part 251m has a trunk portion 251a and a plurality of tips 251b protruding from the front end of the trunk portion 251a. The front ends of the optical cables 13 are held by the tips 251b and are exposed from the front ends of the tips 251b.

The plurality of tips 251b are arranged in the width direction (y-direction) of the trunk portion 251a. Each tip 251b is for example smaller than the trunk portion 251a not only in the width direction, but also in the thickness direction (z-direction).

A pair of posts 251n are for example provided on the two sides of the width direction (y-direction) of the trunk portion 251a and protrude up to a position which is roughly equal to the front end of the trunk portion 251a. The front ends of the posts 251n are tapered so that insertion into the hole portions of the optical receptacle 253 is facilitated.

Figure 8A:
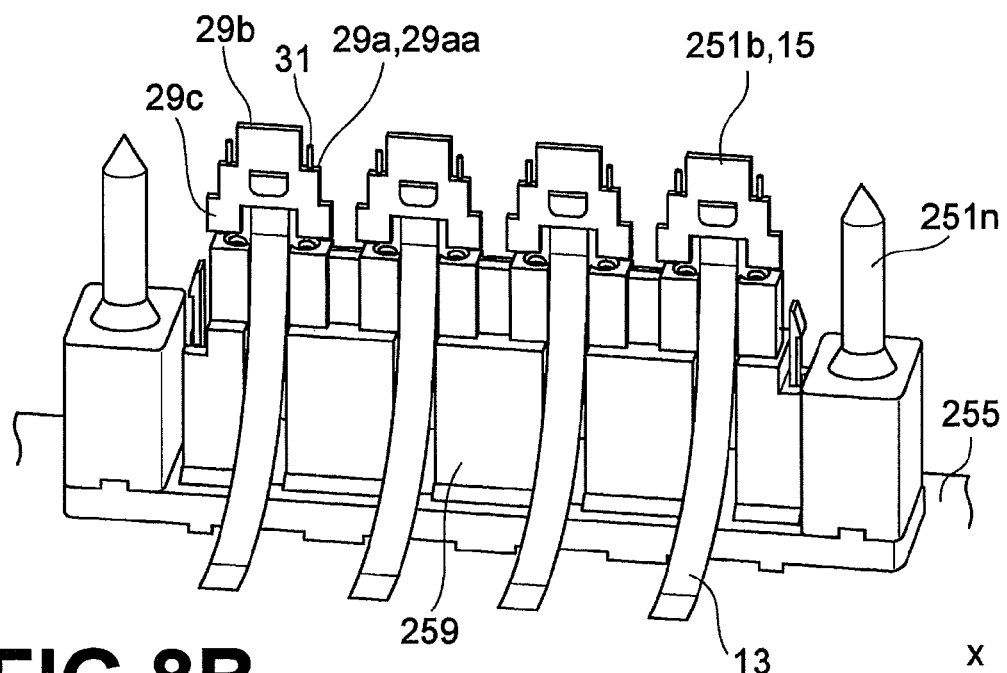
FIG. 8A and FIG. 8B are perspective views of the plug in FIG. 7 showing the state with part of the members detached.
Figure 8B:
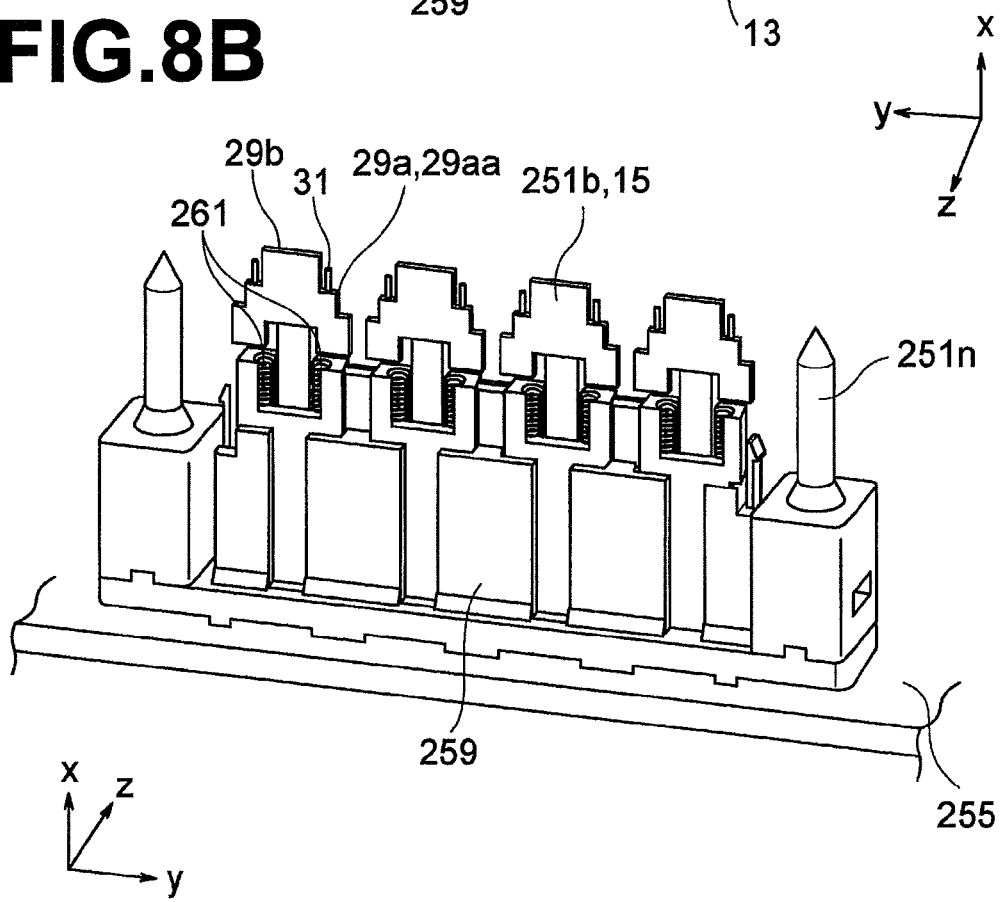

FIG. 8A and FIG. 8B are perspective views of the optical plug 251 shown detaching part of the members.

As shown in FIG. 7 and FIG. 8, the optical plug 251 has a plurality of plugs 15 of the first embodiment, a plug housing 259 for holding the plurality of plugs 15, and elastic members 261 which are interposed among them. The tips 251b are configured by protrusion of the plugs 15 in the first embodiment from the plug housing 259.

The plug housing 259 is for example configured by combining a plurality of members and configures the trunk portion 251a and posts 251n explained above. The trunk portion 251a is for example configured by combining a plurality of members made of a resin, while the posts 251n are for example comprised of a metal. These plurality of members are coupled to each other by suitably using screws, engagement portions, or adhesive and are attached to the midplane 255.

The plug housing 259 is preferably attached to the midplane 255 so that it can move within a predetermined range of play in a direction along the major surface of the midplane 255. That is, preferably a floating structure is employed. By employing the floating structure, the influence of the positioning of the midplane 255 and blades 257 by the electrical connectors 245 which is exerted upon the positioning of the optical cables 13 and the optical waveguide belts 19 by the optical connector 201 is suppressed.

Openings are formed in the front end of the plug housing 259. The front end side portions of the plugs 15 protrude from the openings. Specifically, a portion on the front end side of the base part 29a (including the facing surface 29aa), protruding part 29b, and pins 31 are exposed to the outside of the plug housing 259. The locked portions 29c are engaged with the inner side of the front surface portion of the plug housing 259 and contribute to suppression of detachment of the plug 15 from the opening.

The elastic members 261 bias the plugs 15 to the front end side with respect to the plug housing 259. The elastic members 261 are for example compressed coil springs.

Figure 9A:
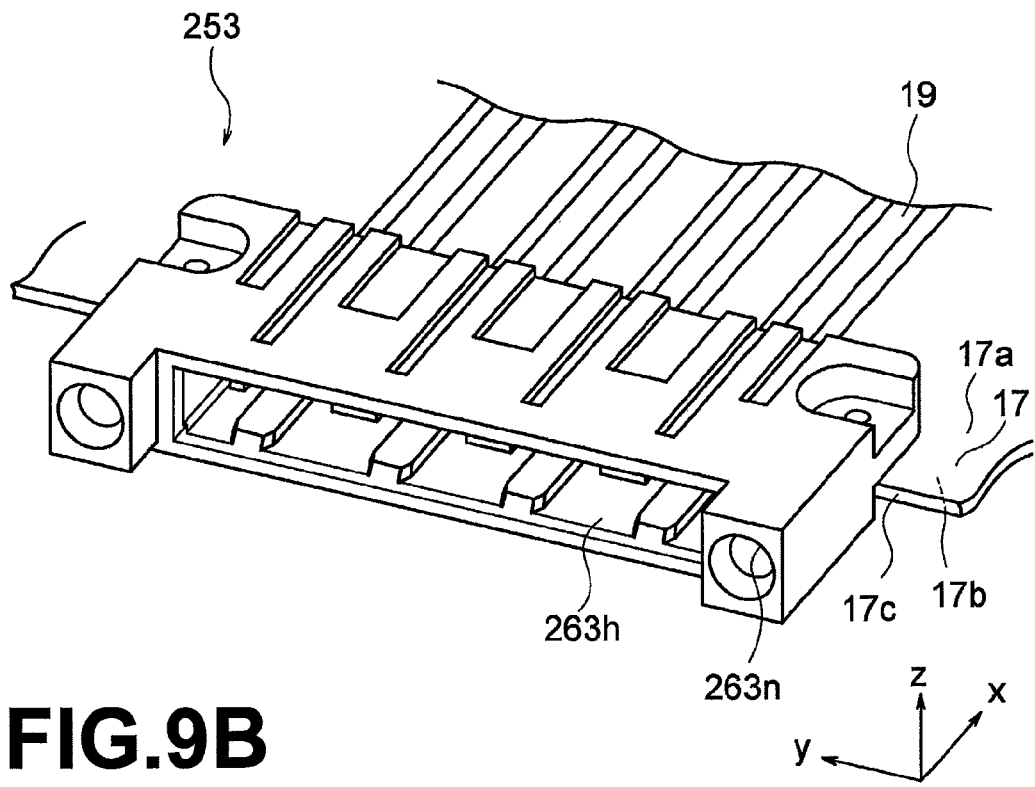
FIG. 9A is a perspective view showing a receptacle of the optical connector in FIG. 5.
Figure 9B:
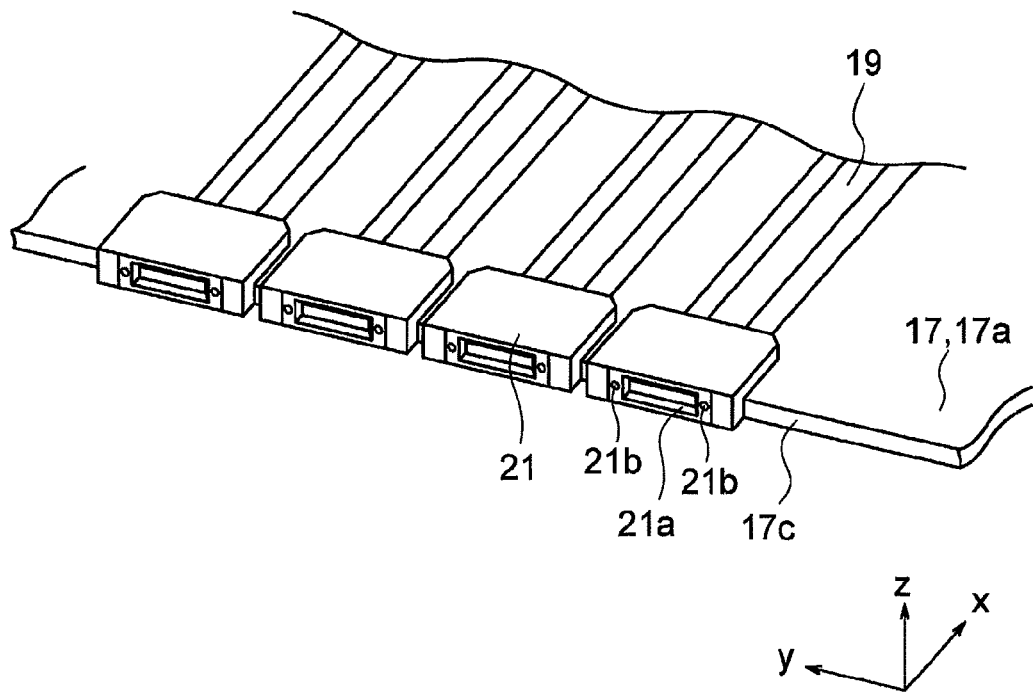
FIG. 9B is a perspective view showing the receptacle in FIG. 9A detaching part of the members.

FIG. 9A is a perspective view showing an optical receptacle 253. FIG. 9B is a perspective view showing the optical receptacle 253 shown by detaching part of the members.

The optical receptacle 253 has a plurality of receptacles 21 of the first embodiment, holders 23 (not shown in FIG. 9) for fastening the plurality of receptacles 21 to the substrate 17, and a receptacle housing 263 covering the receptacles 21. The holders 23 are the same as that explained in the first embodiment.

In the receptacle housing 263, a housing opening 263h for exposing the receptacles 21 to the outside of the receptacle housing 263 are formed. The housing opening 263h is given a shape and size into which the trunk portion 251a of the optical plug 251 fit.

Further, in the receptacle housing 263, post holes 263n in which the posts 251n of the optical plug 251 are fitted are formed. The post holes 263n are formed in portions in the receptacle housing 263 which are configured so as to protrude to the optical plug 251 side (negative side of the x-direction), while the opening ends of the post holes 263n on the optical plug 251 side are located further toward the optical plug 251 side than the opening ends of the housing openings 263n on the optical plug 251 side. The cross-sectional shapes of the post holes 263n correspond to the cross-sectional shapes of the posts 251n and are circular in the present embodiment. The end parts on the optical plug 251 side of the post holes 263n further expand in diameter toward the optical plug 251 side so that the posts 251n are easily inserted (inclined surfaces are formed).

Accordingly, when the optical plug 251 is made to approach the optical receptacle 253, first, the posts 251n start to be inserted into the post holes 263n. At this time, the posts 251n are guided into the post holes 263n and are smoothly inserted even if the optical plug 251 and the optical receptacle 253 deviate in the y-direction or z-direction since the posts 251n are tapered and the post holes 263n further expand in diameter toward the opening ends. That is, the deviation of the optical plug 251 and the optical receptacle 253 in the y-direction and z-direction is solved.

Further, when the clearance between the posts 251n and the post holes 263n becomes smaller down to a predetermined size, the insertion of the body part 251m of the optical plug 251 of starts. Specifically, it is inserted from the tips 251b (plugs 15) into the housing opening 263h (note, they do not slide), next the trunk portion 251a of the body part 251m are fitted in the housing openings 263h.

When insertion further advances in this fitting state, the plugs 15 reach the receptacles 21. Further, as explained in the explanation of the first embodiment, the plugs 15 and the receptacles 21 are connected. That is, the tips 29b are inserted into the exposing openings 21a and further the pins 31 are fitted in the pin holes 21b.

In this way, in the present embodiment, the guidance by the posts 251n and post holes 263n, the guidance by the trunk portion 251a and housing openings 263h, the guidance by the protruding parts 29b and exposing openings 21a, and the guidance by the pins 31 and pin holes 21b are carried out in that order. The positioning precisions of these are for example made sequentially higher.

By formation of the opening of the front end of the plug housing 259 larger than the cross-sectional shape of the base part 29a of the plug 15 and so on, the plug 15 is made able to move with respect to the plug housing 259 within the predetermined range of play in the y-direction and z-direction. The size of this play is made larger than the clearance c1 (or clearance c2) between the protruding part 29b and the exposing opening 21a.

Accordingly, the influence of the positioning by the plug housing 259 and receptacle housing 263 (the positioning by the posts 251n and the post holes 263n and positioning by the trunk portion 251a and housing opening 263h) which is exerted upon the positioning by the plug 15 and the receptacle 21 (positioning by the protruding part 29b and the exposing opening 21a and positioning by the pins 31 and pin holes 21b) is suppressed.

The receptacle housing 263 may be suitably positioned and fastened with respect to the substrate 17. For example, the receptacle housing 263 is made to abut against the first major surface 17a and side surface 17c of the substrate 17 to be positioned. Further, the receptacle housing 263 and the substrate 17 are fastened to each other by screws 265 (FIG. 5) inserted in them and not shown nuts which are screwed with the screws 265.

The first protruding parts 23f (FIG. 1A) of the holders 23 are inserted in not shown groove portions which are formed in the surface of the receptacle housing 263 on the substrate 17 side. Due to this, the holders 23 and receptacles 21 are strongly held and fastened to the substrate 17 and detachment from the substrate 17 is suppressed even when external force is applied to the receptacles 21. That is, the receptacle housing 263 contributes to the fastening of the receptacles 21 to the substrate 17 (optical waveguide belts 19). Note that, the receptacle housing 263 may press the receptacles 21 to the first major surface 17a of the substrate 17 directly or indirectly through plate springs or the like.

As described above, in the second embodiment, each optical connector 201 or optical transmission module 203 includes the optical connector 1 and optical transmission module 3 of the first embodiment. Accordingly, the same effects as those by the first embodiment are exhibited. For example, facilitation or stabilization of high precision positioning, or reduction of profile of the optical connector can be expected.

Further, in the second embodiment, each optical connector 201 has a receptacle housing 263 and plug housing 259. The receptacle housing 263 has a housing opening 263h and fastens the receptacles 21 to the optical waveguides 27 in a state where the exposing openings 21a are exposed from the housing opening 263h. The plug housing 259 hold the plugs 15 in the state where the protruding parts 29b and pins 31 are exposed so that they can move in the directions (y-direction and z-direction) perpendicular to the protruding parts 29b with a play larger than the clearance c2 between the pins 31 and the pin holes 21b, and are fitted in the housing opening 263h.

Accordingly, the optical connector 201 is larger compared with the optical connector 1 in the first embodiment, therefore is advantageous from the viewpoint of work efficiency in connection and so on. On the other hand, the receptacle 253 is divided into two members of the receptacles 21 contributing to positioning and the receptacle housing 263 contributing to the fastening of the receptacles 21, therefore the members contributing to the positioning are reduced in size. As a result, high precision molding of the portion contributing to the positioning is facilitated.

<Third Embodiment>

FIG. 10 is a perspective view showing an optical connector 301 and optical transmission module 303 according to a third embodiment of the present invention in a non-connection state.

The optical connector 301 includes the optical connector 1 in the first embodiment as a portion thereof, and the optical transmission module 303 includes the optical transmission module 3 in the first embodiment as a portion thereof. Note that, the third embodiment may be grasped as an example of application of the first embodiment as well.

The optical connector 301, in the same way as the optical connector 201 in the second embodiment, is given a configuration in which mainly a housing is added to the optical connector 1 in the first embodiment. Note that in contrast to the optical connector 201 in the second embodiment given the configuration connecting one substrate to another substrate, the optical connector 301 in the present embodiment is given a configuration connecting the optical cables 13 and the substrate 17. Specifically, this is as follows.

The optical connector 301 has a plug 351 for holding the optical cables 13 and a receptacle 353 which is fastened to the substrate 17.

The receptacle 353, basically, may be given the same configuration as that of a receptacle 253 in the second embodiment. That is, the receptacle 353 has the receptacle 21 (FIG. 9B) in the first embodiment, a holder 23 (FIG. 1), and a receptacle housing 363 for fastening the receptacle 21 to the substrate 17.

Note that, in the example in FIG. 10, post holes 263n of the second embodiment are not formed in the receptacle housing 363, and the receptacle housing 363 is given a shape and size corresponding to only one receptacle 21 (optical waveguide belt 19). Further, the receptacle housing 363 is different from the receptacle housing 263 in the second embodiment in the shapes of details as well.

Note, the receptacle housing 363 may be made exactly the same as the receptacle housing 263 in the second embodiment as well. Further, in this case, a plurality of plugs 351 may be connected to one receptacle housing 363 as well.

FIG. 11 is a disassembled perspective view of the plug 351.

The plug 351 basically may be given the same configuration as that of the plug 251 in the second embodiment except for the point that it holds only one optical cable array 13 (or ribbon optical fiber or tape optical fiber) and one plug 15 and the point that a configuration for fastening to the midplane 255 is not provided.

Specifically, the plug 351 has the plug 15 of the first embodiment, a plug housing 359 holding the plug 15, and elastic members 261 biasing the plug 15 with respect to the plug housing 359.

The plug housing 359 holds the plug 15 in a state where a portion on the front side of the base part 29a, the protruding part 29b, and pins 31 are exposed. Further, the plug 15 can move relative to the plug housing 359 in the y-direction and z-direction with a play larger than the clearance c1 (or clearance c2) between the protruding part 29b and the exposing opening 21a.

As described above, in the third embodiment, the optical connector 301 or optical transmission module 303 includes the optical connector 1 and optical transmission module 3 of the first embodiment. Accordingly, the same effects as those by the first embodiment are exhibited. For example, facilitation or stabilization of high precision positioning, or reduction of the profile of the optical connector can be exhibited.

Further, in the third embodiment, the optical connector 301 or optical transmission module 303 has the plug housing 359 which holds the plug 15 of the first embodiment and the receptacle housing 363 which fastens the receptacle 21 of the first embodiment to the substrate 17. Accordingly, for example, in the same way as the second embodiment, the receptacle 21 contributing to the positioning is reduced in size and thereby making it possible to mold this with a high precision while controlling the size of the optical connector as a whole to facilitate the work.

<Fourth Embodiment>

Figure 12:
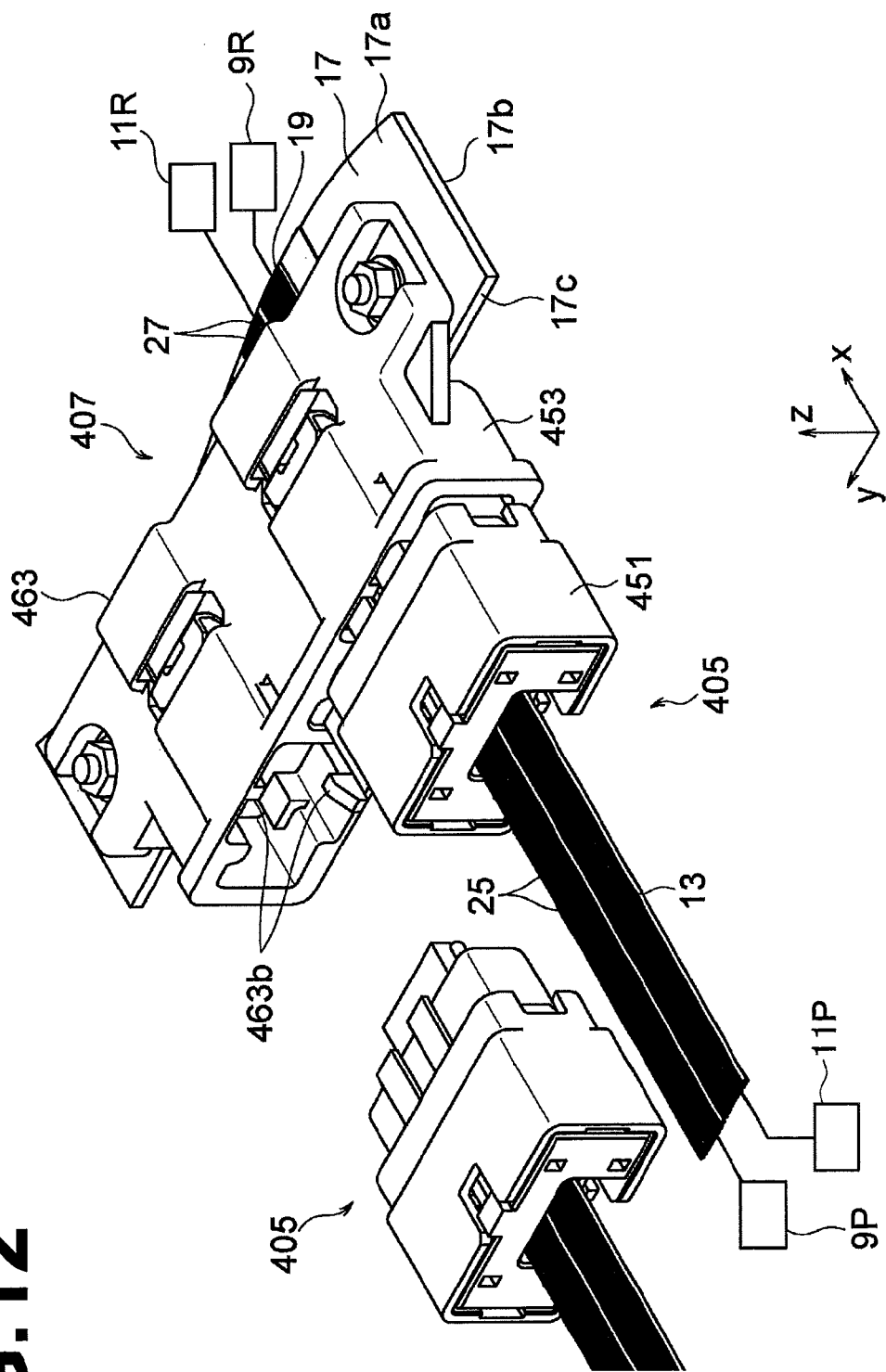
FIG. 12 A perspective view showing an optical connector according to a fourth embodiment of the present invention.

FIG. 12 is a perspective view showing an appearance of an optical connector 401 and optical transmission module 403 according to a fourth embodiment of the present invention.

The optical connector 401 includes the optical connector 1 of the first embodiment as a portion thereof, while the optical transmission module 401 includes the optical transmission module 3 of the first embodiment as a portion thereof. Note that, the fourth embodiment may be grasped as an example of application of the first embodiment as well.

The optical connector 401, in the same way as the optical connector 301 of the third embodiment, is given a configuration formed by mainly adding a housing with respect to the optical connector 1 in the first embodiment and is given a configuration connecting the optical cables 13 and the substrate 17. Note, the optical connector 401 in the present embodiment is given a configuration whereby the possibility of detachment of the plug from the receptacle is reduced, while the plug can be easily and conveniently pulled out when intentionally pulling the plug out of the receptacle. Specifically, this is as follows.

The optical transmission module 403 has a plug assembly 405 and a receptacle assembly 407 which is optically connected to the plug assembly 405. In the present embodiment, the receptacle assembly 407 can be connected to a plurality of (more specifically, two) plug assemblies 405.

In the following description, for the plug assembly 405, the receptacle assembly 407 side (positive side of the x-direction) will be sometimes referred to as the front, and the opposite side thereof will be sometimes referred to as the rear. In the same way, for the receptacle assembly 407, the plug assembly 405 side (negative side of the x-direction) will be sometimes referred to as the front, and the opposite side to the former will be sometimes referred to as the rear.

The configuration of the plug assembly 405 is the same as the plug assembly of the first or third embodiment except the configuration of the housing for holding the plug 15 of the first embodiment. Further, the configuration of the receptacle assembly 407 is the same as the receptacle assembly of the first or third embodiment except the configuration of the housing fastening the receptacle 21 of the first embodiment to the substrate 17.

Figure 13:
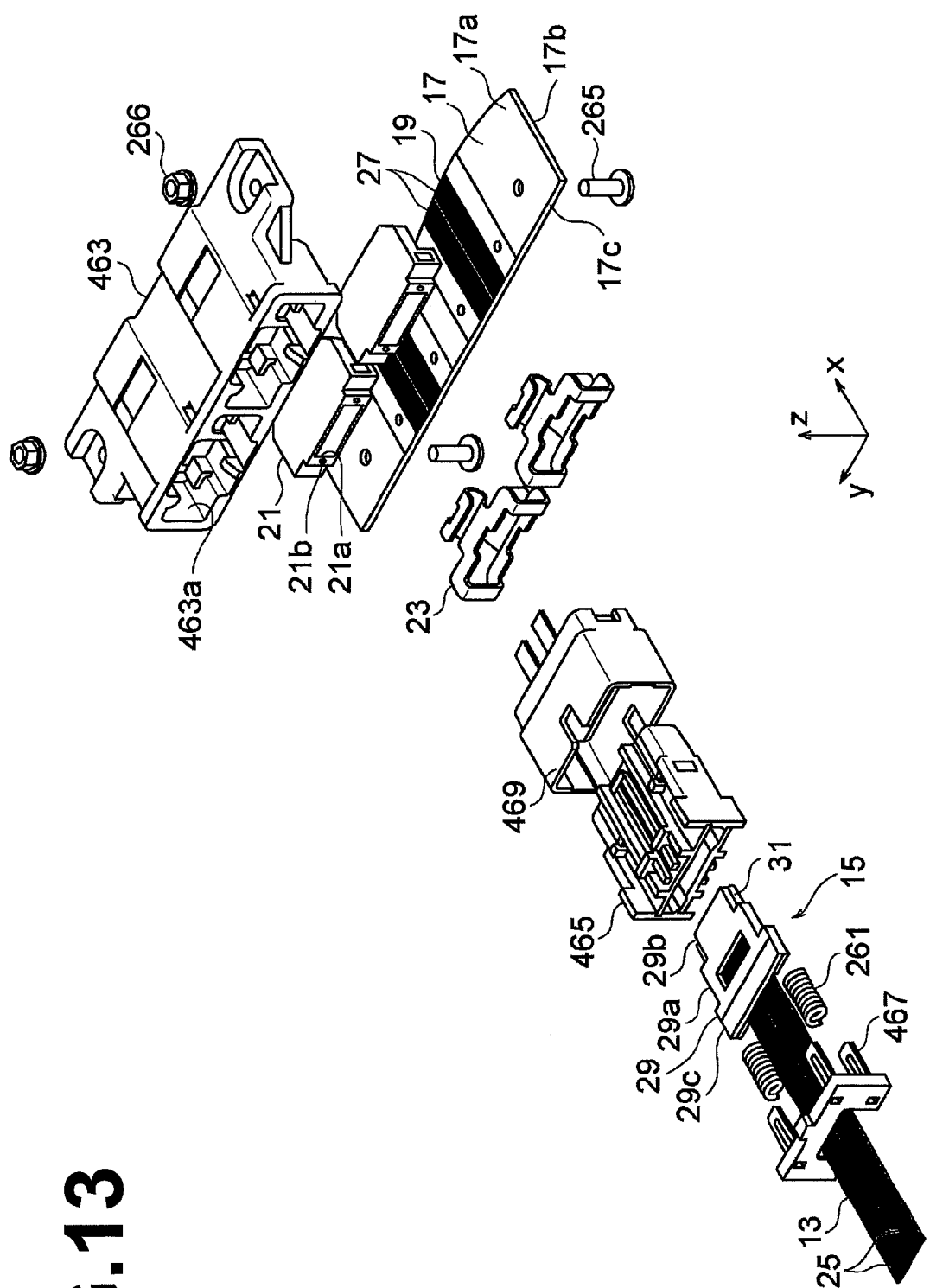
FIG. 13 A disassembled perspective view of the optical connector in FIG. 12.

FIG. 13 is a disassembled perspective view of the optical connector 401 and optical transmission module 403.

The plug 451, for example, has the plug 15 of the first embodiment, a plug holder 465 which holds the plug 15, a plug holder lock 467 which close the rear end of the plug holder 465, elastic members 261 (springs) which bias the plug 15, and a plug cover 469 covering the plug holder 465.

The plug holder 465, for example, is formed in a hollow shape which opens in the front surface and the rear surface so that it can accommodate the plug 15 in the first embodiment. The external form thereof is for example a schematically thin cuboid shape. The plug 15 is inserted into the plug holder 465 from the back of the plug holder 465 and is accommodated in the plug holder 465. In the plug 15, the protruding part 29b, pins 31, and the front end side portion of the base part 29a are exposed from the front opening of the plug holder 465 (see FIG. 14). At this time, the locked portions 29c of the plug 15 are engaged forward with respect to a suitable portion in the plug holder 465. The internal space of the plug holder 465 is for example formed a little larger than the portion of the plug 15, the portion being accommodated in the plug holder 465. Therefore the plug 15 can move in the x-direction, y-direction, and z-direction within a predetermined range of play with respect to the plug holder 465. Note that, the play in the y-direction and z-direction is relatively very small.

The plug holder lock 467 closes the rear opening of the plug holder 465 and are fastened to the plug holder 465 by the engagement portion or screws etc. That is, the plug 15 in the first embodiment is accommodated in a member configured by the plug holder 465 and plug holder lock 467.

The elastic members 261 are for example configured by coil springs. The elastic members 261 are interposed between the plug holder lock 467 and the plug 15 in the first embodiment in the compressed state and bias the plug 15 forward with respect to the plug holder 465 and plug holder lock 467.

The plug cover 469 is for example formed in a hollow shape which opens in the front surface and the rear surface so that it can accommodate the plug holder 465. The external form thereof is for example a schematically thin cuboid shape. The plug cover 469 configures the upper surface, lower surface, and side surfaces (two) of the plug 451. The area thereof is for example ⅓ or more, or half or more of the area of all of these four surfaces of the plug 451. The plug holder 465 is inserted into the plug cover 469 from the front of the plug cover 469 to be accommodated inverse to the locational relationships shown in FIG. 13. After that, the plug holder lock 467 is fastened to the plug holder 465.

The receptacle 453 has the receptacle 21 of the first embodiment which is provided for positioning of the plug 15 of the first embodiment, the holder 23 which fastens the receptacle 21 to the substrate 17, a receptacle housing 463 covering the receptacle 21, and screws 265 and nuts 266 for fastening the receptacle housing 463 to the substrate 17. Note that, in the present embodiment, corresponding to the fact that the two plugs 451 can be connected to the receptacle 453, the receptacle 453 has two receptacles 21 and holders 23.

The receptacle housing 463 may be substantially the same as the receptacle housing of the second or third embodiment except the point that engaged portions 463b which will be explained later are provided. Note that, in the shown example, the post holes 263n of the second embodiment is not formed in the receptacle housing 463, the shapes of details are different from those in the receptacle housing of the second or third embodiment as well. However, these points are made the same as the second or third embodiment.

In the housing openings 463a in the receptacle housing 463, the plug holders 465 are fitted. That is, the plug holders 465 are the portions corresponding to the plug housing of the second or third embodiment.

The members configuring the plugs 451 and receptacle 453, in the same way as the other embodiments, may be configured by a resin, ceramic, metal, or other suitable materials. Note, in the plug holder 465, at least parts reducing detachment of the plugs 451 from the receptacle 453 as will be explained later are configured by a resiliently deformable material such as a resin or metal. Further, the elastic members 261 and holders 23 are configured by materials which can be resiliently deformed as well.

Figure 14A:
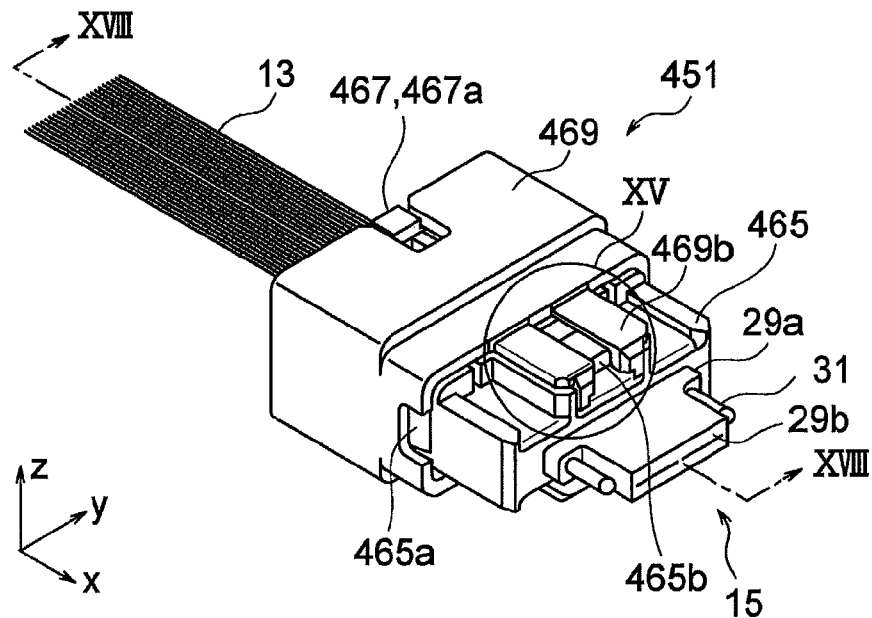
FIG. 14A and FIG. 14B are perspective views showing the plug of the optical connector in FIG. 12 in a usual state and in an unlocked state.
Figure 14B:
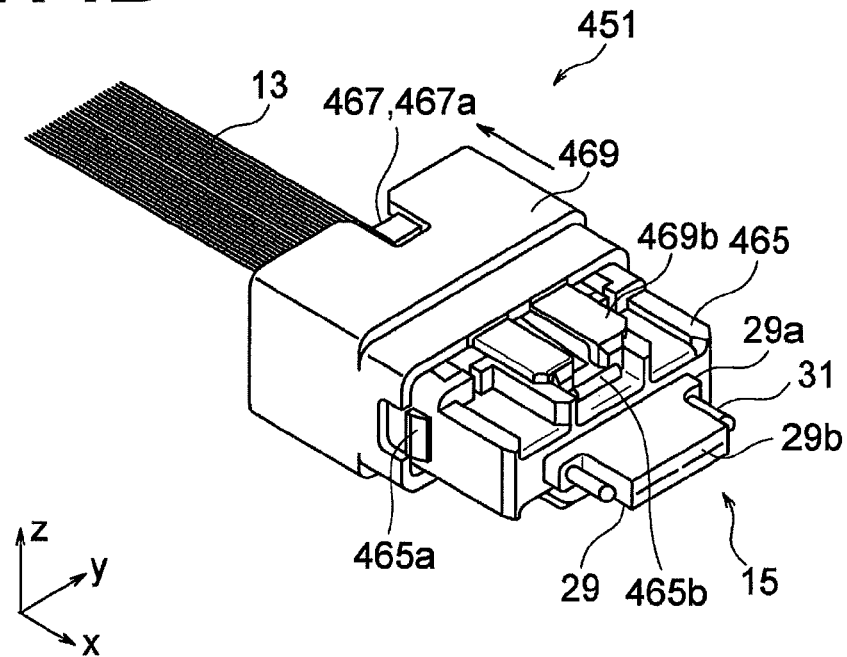

FIG. 14A is a perspective view showing a plug 451 in a usual state, and FIG. 14B is a perspective view showing a plug 451 in an unlocked state.

The plug cover 469 can move in the front-back direction between the forward limit at which it is located as shown in FIG. 14A and the backward limit at which it is located as shown in FIG. 14B with respect to the plug 15 in the first embodiment, plug holder 465, and plug holder lock 467.

The plug cover 469, at the forward limit, for example, is restricted in forward movement beyond this by abutting of the edge part on the front side against the advancement stopper 465a which is formed on the side surface of the plug holder 465. Further, the plug cover 469, at the backward limit, for example, is restricted in retraction more than this by abutting of the edge part on the rear side against the retraction stopper 467a which is formed on the upper surface of the plug holder lock 467.

Other than this, the backward limit may be set by forming relief shapes on the inner surface of the plug cover 469 and the outer surface of the plug holder 465 as well. For example, in the plug cover 469, in the up-down direction, the diameter of the front portion is made smaller than the diameter of the rear portion, therefore steps are formed on the inner surface (see FIG. 18). On the other hand, on the upper surface and lower surface of the plug holder 465, retraction stoppers 467b (see FIG. 18) are formed which are accommodated in the rear portions of the plug cover 469 and are engaged forward with respect to the steps described above when the plug cover 469 is located at the backward limit.

Note that, preferably, a pair of upper and lower backward limit stoppers and/or pair of left and right backward limit stoppers are provided so that the force applied to the plug cover 469 is not concentrated to only one surface of the plug holder 465. This is the same also for the forward limit stopper.

Figure 15:
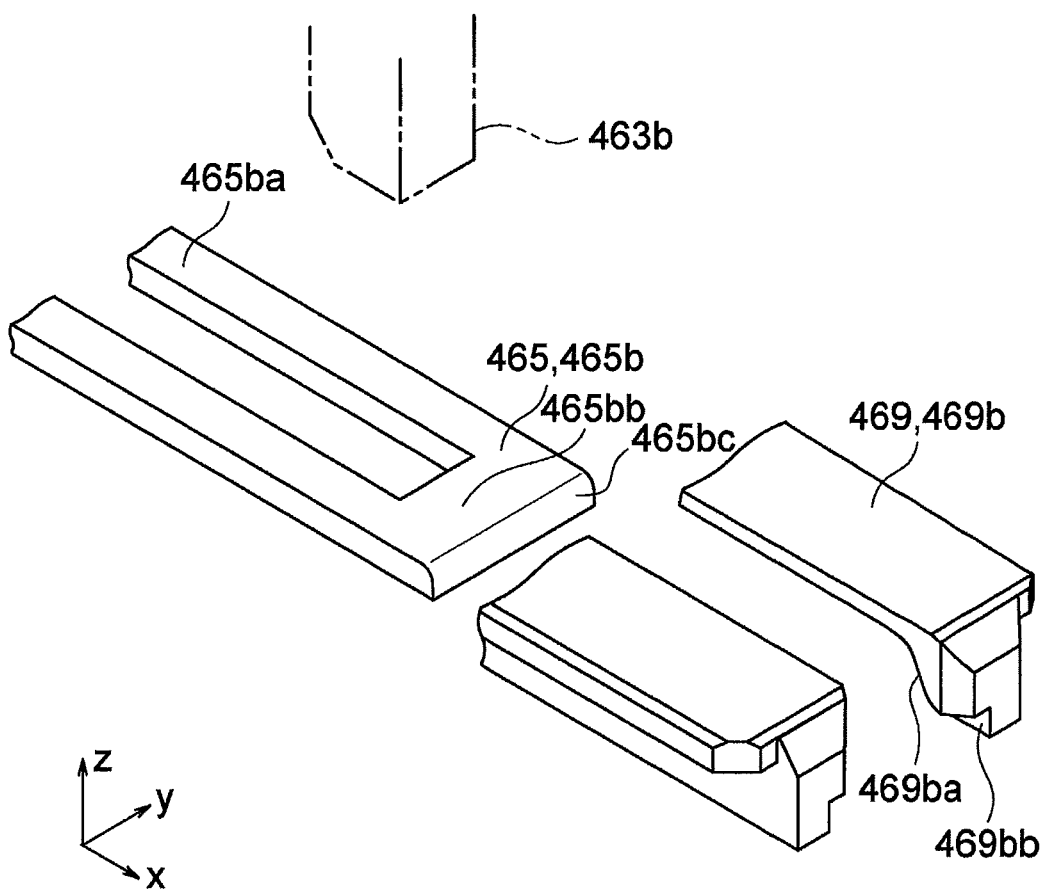
FIG. 15 A disassembled perspective view of a portion of the plug in FIG. 14A.
Figure 16A:
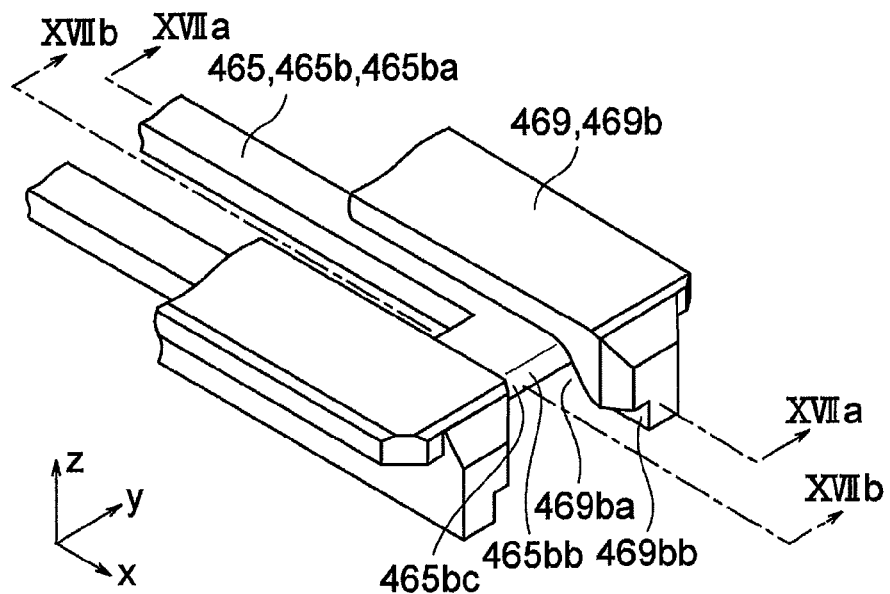
FIG. 16A and FIG. 16B are perspective views showing a portion of the plug in FIG. 15 in the usual state and in the unlocked state.

FIG. 15 is a disassembled perspective view of a portion of the plug 451 (the portion shown by the region XV in FIG. 14A), FIG. 16A is a view showing the above portion in the usual state (enlarged view of part of FIG. 14A), and FIG. 16C is a view showing the above portion in the unlocked state (enlarged view of part of FIG. 14B).

The plug holder 465 has the engagement portion 465b for reducing detachment of the plug 451 from the receptacle 453. The engagement portion 465b for example has a shape of a plate which is long in the front-back direction and formed with a hole or notch. That is, the engagement portion 465b has two beams 465ba extending parallel to each other and an engagement body part 465bb which bridges the two beams 465ba. In the beams 465ba, for example, the rear end parts (negative side of the x-direction) are made the fastened ends, the front end parts are made the free ends, and the beams are therefore supported in a so-called cantilever state. The engagement body part 465bb connects the free ends of the two beams 465ba to each other.

On the front end of the engagement portion 465b, an inclined surface 465bc which is located further on the inner side of the plug 451 (lower side in FIG. 15 and FIG. 16) the further to the front side is formed. The inclination angle of the inclined surface 465bc may be suitably set. Further, the inclined surface 465bc may be made a flat surface, may be made a curved surface having a constant curvature, or may be made a curved surface having a changing curvature.

On the other hand, in the receptacle 453 (more specifically the receptacle housing 463), as indicated by two-dotted chain lines in FIG. 15, an engaged portion 463b (see FIG. 12 as well) is formed. By insertion of the engaged portion 463b between the two beams 465ba (hole of the engaged portion 463b), the engagement body part 465bb and the engaged portion 463b are engaged in a direction obstructing the detachment of the plug 451 from the receptacle 453. That is, the engagement portion 465b is engaged backward with respect to the receptacle 453.

The plug cover 469 has disengagement portions 469b for disengaging the engagement portion 465b and the engaged portion 463b by making the engagement portion 465b displace to the inside of the plug 451 (lower side in FIG. 15 and FIG. 16).

Two disengagement portions 469b are provided sandwiching the holes of the engagement portions 465b therebetween so as to expose the holes of the engagement portions 465b to the outsides of the plug covers 469. Each disengagement portion 469b is for example formed in a long shape so that it extends forward from the edge part of the hollow body portion of the plug cover 469. Further, in each disengagement portion 469b, a notch portion 469bb is formed at the corner portion on the side which is between the two disengagement portions 469b and on the inner side of the plug 451 (on the plug holder 465 side). The two notch portions 469bb configure a guide groove capable of accommodating the engagement portion 465b and capable of guiding the engagement portion 465b in the front-back direction.

In this guide groove, inclined surfaces 469ba which abut against the front end of the engagement portion 465b in the usual state (FIG. 16A) (or at the time when the plug cover 469 is located a little backward). The inclined surface 469ba is inclined so as to be located further on the inner side of the plug 451 (in the lower side in FIG. 15 and FIG. 16) the further to the front side. The inclination angle of the inclined surface 469ba may be suitably set. Further, the inclined surface 469ba may be formed as a flat surface, may be formed as a curved surface having a constant curvature, or may be formed as a curved surface having a changing curvature.

Figure 16B:
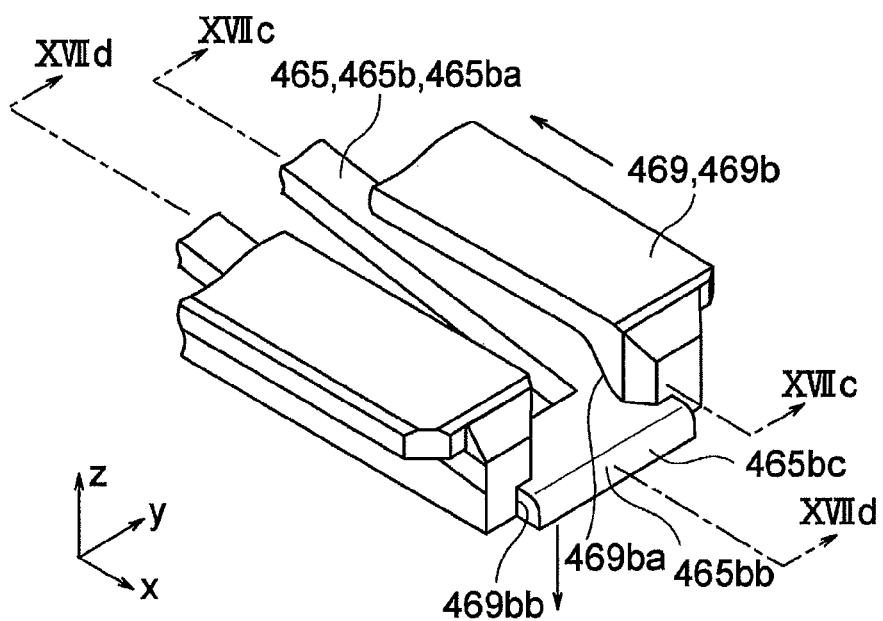
Figure 17A:
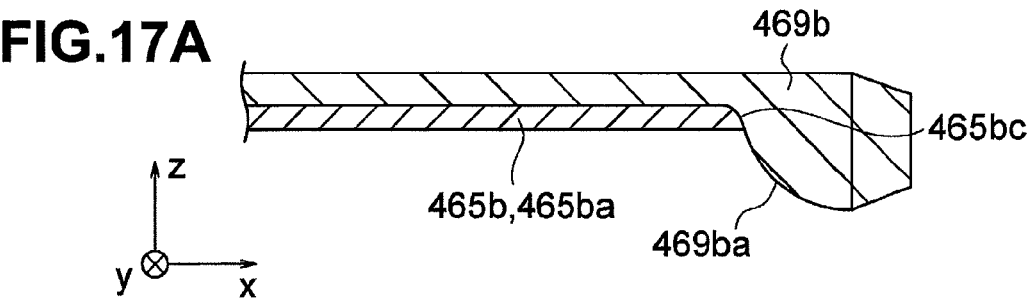
FIG. 17A to FIG. 17D are cross-sectional views taken along the line XVIIa-XVIIa, line XVIIb-XVIIb, line XVIIc-XVIIc, and line XVIId-XVIId in FIG. 16A and FIG. 16B.
Figure 17B:
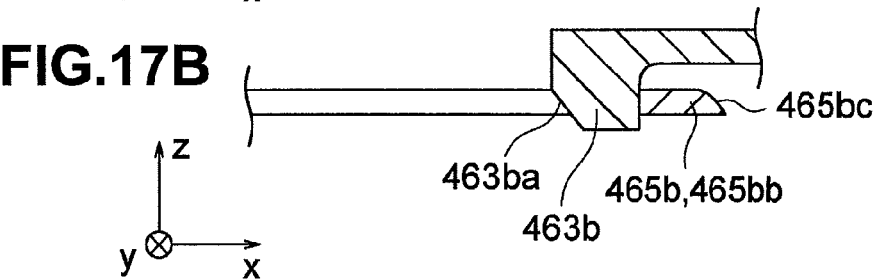
Figure 17C:
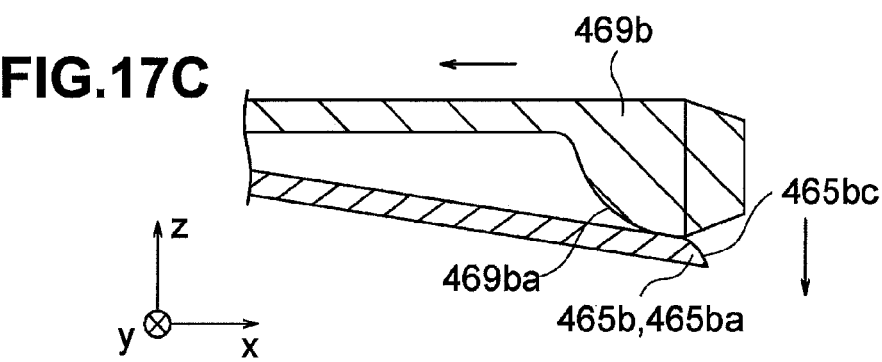
Figure 17D:
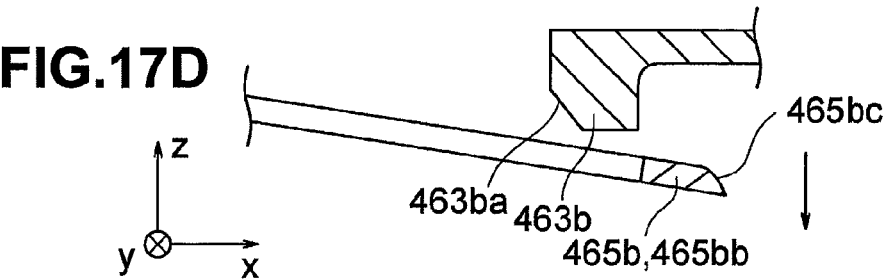
Figure 17E:
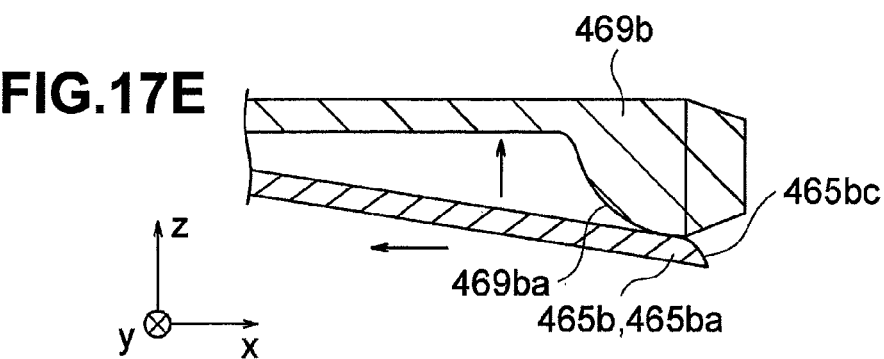
FIG. 17E is a cross-sectional view showing the middle of shift from FIG. 17C to FIG. 17A.

FIG. 17A, FIG. 17B, FIG. 17C, and FIG. 17D are cross-sectional views taken along the line XVIIa-XVIIa, line XVIIb-XVIIb, line XVIIc-XVIIc, and line XVIId-XVIId in FIG. 16A and FIG. 16B, and FIG. 17E is a cross-sectional view showing the middle of shift from FIG. 17C to FIG. 17A.

As shown in FIG. 14A, FIG. 16A, and FIG. 17A, in the usual state where the plug cover 469 is located at the forward limit, the front end of the engagement portion 465b of the plug holder 465 is for example located on the rearmost side (negative side of the x-direction) of the inclined surface 469ba of the disengagement portion 469b of the plug cover 469. Note that, the front end of the engagement portion 465b may not abut against the inclined surface 469ba or may abut against a portion of the inclined surface 469ba which is a bit forward than the rearmost position thereof. Further, as shown in FIG. 17B, in this usual state, the engaged portion 463b is inserted between the two beams 465ba and is engaged with respect to the engagement body part 465bb.

Next, as shown in FIG. 14B, FIG. 16B, and FIG. 17C, when the plug cover 469 is moved backward, the front end of the engagement portion 465*b* slides on the inclined surfaces 469*ba*, is pushed to the inside of the plug 451 (downward in these diagrams) by the inclined surfaces 469*ba*, and displaces. Due to this, as shown in FIG. 17D, the engagement portion 465*b* and the engaged portion 463*b* are disengaged. Note that, the inclined surface 465*bc* on the front end of the engagement portion 465*b* contributes to reliably depressing the front end of the engagement portion 465*b* toward the inside of the plug 451 by the inclined surfaces 469*ba*.

When the front end of the engagement portion 465*b* is made to displace by the inclined surfaces 469*ba* of the disengagement portions 469*b* as explained above, the beams 465*ba* of the engagement portion 465*b* cause elastic deformation (warp). That is, the beams 465*ba* generate a restoring force pressing the front end of the engagement portion 465*b* against the outside of the plug 451 (upward in FIG. 17 etc.) with respect to the inclined surfaces 469*ba*.

Accordingly, as shown in FIG. 17E, when the force moving the plug cover 469 backward with respect to the plug holder 465 is eliminated, the front end of the engagement portion 465*b* slides backward with respect to the inclined surfaces 469*ba* by the restoring force of the beams 465*ba*. That is, the plug cover 469 and the plug holder 465 automatically return to the state in FIG. 17A by the restoring force of the beams 465*ba*.

In the above description, an explanation was given of the upper part of the optical connector 401 for the engagement portion 465*b*, engaged portion 463*b*, and disengagement portion 469*b*. In the same way as the upper part, for the lower part of the optical connector 401 as well, the engagement portion 465*b*, engaged portion 463*b*, and disengagement portions 469*b* are provided (see FIG. 18). The members in the upper part and the members in the lower part, which are the engagement portions 465*b*, engaged portions 463*b*, and disengagement portions 469*b*, are for example given the shapes and positions which are mutually rotational symmetric by 180° with respect to the center line of the plug 15 in the first embodiment extending in the x-axis direction.

FIG. 18A to FIG. 18C are cross-sectional views corresponding to the line XVIII-XVIII in FIG. 14 for explaining the mode of operation of the optical connector 401.

FIG. 18A shows the non-connection state of the optical connector 401. In this state, the plug cover 469 is for example located at the forward limit. Accordingly, the front end of the engagement portion 465*b* of the plug holder 465 is located on the rearmost side of the inclined surfaces 469*ba* of the disengagement portions 469*b* of the plug cover 469. From this state, the user of the optical connector 401 for example holds the plug cover 469 (for example nips it in the up-down direction) by his fingers or a jig and moves the plug 451 forward (approach) with respect to the receptacle 453.

FIG. 18B shows a state where the fitting (insertion) of the plug 451 into the receptacle 453 is completed. In the process from FIG. 18A to FIG. 18B, the insertion of the plug 15 of the first embodiment into the housing opening 463*a* of the receptacle housing 463, the insertion of the plug holder 465 into the housing opening 463*a*, the insertion of the protruding part 29*b* of the plug 15 into the exposing opening 21*a* of the receptacle 21 in the first embodiment, and the insertion of the pins 31 of the plug 15 into the pin holes 21*b* of the receptacle 21 are started in that order. By these insertions, the positioning of the optical cable 13 and the optical waveguide belt 19 in the y-direction and z-direction is carried out. Further, the front end face of the protruding part 29*b* abuts against the side surface 17*c* of the substrate 17 to be positioned in the x-direction. The contact pressure at this time is defined according to the biasing force of the elastic members 261.

Further, in the process of insertion described above, the inclined surface 463*ba* (see FIG. 17B and FIG. 17D as well) of the engaged portion 463*b* of the receptacle housing 463 also abuts against the front end of the engagement portion 465*b* through a gap between the two disengagement portions 469*b* of the plug cover 469. The inclined surface 463*ba* is inclined so as to be located further on the inner side in the up-down direction of the plug 451 the further to the plug 451 side. Accordingly, the engagement portion 465*b* is pushed toward the inside in the up-down direction of the plug 451 and displaces by the inclined surface 463*ba* of the engaged portion 463*b*. After that, when the engaged portion 463*b* passes the engagement body part 465*bb* of the engagement portion 465*b*, due to the restoring force of the beams 465*ba*, the engagement portion 465*b* returns to its original position and is engaged with respect to the engaged portion 463*b*. This engagement, as already explained, is carried out on both of the upper side and lower side of the plug 15 in the first embodiment (the optical cable 13 and optical waveguide belt 19). Note that, the inclined surface 465*bc* of the engagement portion 465*b* contributes to reliably depressing the front end of the engagement portion 465*b* toward the inside of the plug 451 by the inclined surface 463*ba* of the engaged portion 463*b*.

Further, in the process of insertion described above, the plug 451 receives resistance force against insertion from the receptacle 453. The resistance is the sliding friction or force for making the engagement portion 465*b* displace (resiliently deform). The resistance which acts upon the plug 15 in the first embodiment is transmitted to the plug holder 465 holding the plug 15 and the plug holder lock 467. The resistance force acting upon (including transmission) the plug holder 465 and the plug holder lock 467 is transmitted through the advancement stopper 465*a* (FIG. 14) of the plug holder 465 to the plug cover 469. Accordingly, the user can insert the plug 451 into the receptacle 453 by just holding the plug cover 469.

FIG. 18C shows the preliminary step of pulling the plug 451 out of the receptacle 453. In this preliminary step, the plug cover 469 is retracted to the backward limit. Accordingly, as already explained, the engagement portion 465*b* has been made to displace to the inside in the up-down direction of the plug 451 by the inclined surfaces 469*ba* of the disengagement portions 469*b*, and the engagement portion 465*b* and the engaged portion 463*b* are disengaged.

After that, the plug 451 is pulled out of the receptacle 453. At this time, in the same way as the insertion of the plug 451, the plug 451 receives the sliding friction from the receptacle 453. The resistance force acting upon the plug 15 is transmitted to the plug holder 465 holding the plug 15 of the first embodiment and plug holder lock 467. The resistance force (including transmission) acting upon the plug holder 465 and the plug holder lock 467 is transmitted through the retraction limit stopper 467*a* (FIG. 14) of the plug holder lock 467 to the plug cover 469. Accordingly, the user can pull the plug 451 out of the receptacle 453 by holding only the plug cover 469 in the same way as the time of insertion.

When the plug 15 in the first embodiment and the plug holder 465 are pulled out and the resistance force acting upon them is lost, the force moving the plug cover 469 backward with respect to the plug holder 465 ends up being lost. Accordingly, as explained with reference to FIG. 17E, the plug holder 465 and the plug cover 469 automatically return to the state in FIG. 18A due to the restoring force of the engagement portion 465*b*.

As described above, in the present embodiment, the optical connector 401 has the receptacle 453 which is fastened to the optical waveguides 27 and the plug 451 which is fastened to the optical fibers 25 and optically connects the optical waveguides 27 and the optical fibers 25 by the positioning together with the receptacle 453. The plug 451 has the plug 15 (more specifically the protruding part 29*b* and pins 31) which is fastened to the optical fibers 25 and is fitted in the receptacle 453 by the forward movement with respect to the receptacle 453, the engagement portion 465*b* which is coupled to the plug 15 and is capable of engaging backward with respect to the receptacle 453 being in the fitting state with the plug 15, and the plug cover 469 which can move backward with respect to the plug 15 while making the engagement portion 465*b* displace to the disengaging direction.

Accordingly, by the operation of moving the plug cover 469 backward, the engagement portion 465*b* can be easily disengaged. In addition, this operation leads to the operation of pulling the plug 451 (plug 15) out of the receptacle 453 (releasing the fitting). That is, the disengagement and pulling out can be carried out in one action retracting the plug cover 469, therefore the plug 451 can be detached from the receptacle 453 extremely easily.

Further, in the present embodiment, the plug cover 469 has the inclined surfaces 469*ba* capable of abutting backward with respect to the engagement portion 465*b*, and located to a direction to which the engagement portion 465*b* displaces for disengagement toward the front side.

Accordingly, the displacement of the engagement portion 465*b* is realized by sliding of the engagement portion 465*b* and the inclined surfaces 469*ba*. That is, the displacement of the engagement portion 465*b* is realized by an extremely simple configuration of forming the inclined surfaces 469*ba*. As a result, for example, reduction of size and lowering of cost etc. of the plug 451 can be expected.

Further, in the present embodiment, the plug cover 469 has a hollow shape (tubular state) configuring the upper surface, lower surface, and side surfaces (at least a portion of each of the surfaces) of the plug 451.

Accordingly, it is easy to hold the entire plug 451 by holding the plug cover 469 by fingers or a jig. As a result, the disengagement and pulling out by one action explained above are further suitably carried out. Further, the structural strength of the plug cover 469 is easily secured. For example, damage of the plug 451 when pulling out and inserting the plug 451 is reduced.

Further, in the present embodiment, the plug 451 has the advancement stopper 465*a* which is coupled to the plug 15 of the first embodiment and with which the plug cover 469 engages forward at the time when the plug cover 469 is located at the position where the engagement portion 465*b* is not disengaged and has the retraction stopper 467*a* which is coupled to the plug 15 and with which the plug cover 469 engages backward at the time when the plug cover 469 is located at the position where the engagement portion 465*b* is disengaged.

Accordingly, the force for insertion of the plug 451 into the receptacle 453 can be reliably transmitted from the plug cover 469 through the advancement stopper 465*a* to the plug 15 of the first embodiment. Further, the force for pulling the plug 451 out of the receptacle 453 can be reliably transmitted from the plug cover 469 through the retraction stopper 467*a* to the plug 15. As a result, the operation of disengagement and detachment by one action explained above is further suitably carried out. Naturally, these stoppers also contribute to prevention of detachment and loss of the plug cover 469 from the plug 15 or plug holder 465 etc.

Further, in the present embodiment, engagement portions 465*b* are provided at the two sides of the direction (z-direction) intersecting with (preferably perpendicular to) the direction of connection of the optical waveguides 27 and the optical fibers 25.

Accordingly, the up-down rocking of the plug 451 about the point near the connection position of the optical waveguides 27 and the optical fibers 25 is reduced, and consequently inclination of the portion of the optical fibers 25 held by the plug 451 up and down with respect to the optical waveguides 27 is reduced. Here, the connection of the optical transmission lines with each other is preferably linear abutting of the optical transmission lines with respect to each other in order to reduce leakage of light unlike electrical connection. Accordingly, by provision of the engagement portions 465*b* in the upper part and lower part, suitable connection reducing the leakage of light is carried out.

Further, in the present embodiment, the receptacle 453 can be connected to a plurality of (two in the present embodiment) plugs 451 which are arranged in a lateral line. The engagement portions 465*b* are located at the two sides of the direction (z-direction) intersecting with (preferably perpendicular to) the direction of connection of the optical waveguides 27 and the optical fibers 25 and intersect with (preferably are perpendicular to) the direction of arrangement of the plurality of plugs 451.

Accordingly, the receptacle 453 is shared at least partially by the plurality of plugs 451, and engagement portions 465*b* are not arranged between the plurality of plugs 451, therefore it becomes possible to make the distances between the plurality of plugs 451 shorter and arrange the plurality of plugs 451 with a higher density. When the plurality of plugs 451 are arranged with a high density in the lateral direction, insertion and detachment of the plug 451 are carried out by making the fingers or a jig abut against the upper and lower surfaces of the plug cover 469. The abutting position and the engagement portion 465*b* are close. Therefore, for example, it becomes easier to transmit force to the engagement portion 465*b*, so detachment of the plug 451 can be smoothly carried out.

Further, in the present embodiment, levers, buttons, and other locking structures do not appear in the appearance of a plug 451. Accordingly, for example, when working at a deep position in the apparatus or at a place which is hard to see, the worker can pull out a plug by just pulling it by holding the plug cover 469, therefore the work efficiency is extremely excellent. Further, the appearance can be made a flat surface shape (relief shapes can be reduced), therefore clothes, tools, fibers, etc. are hardly ever caught at the time of working. As a result, damage of the plug 451 and detachment of the connector can be prevented.

Note that, in the above embodiments, the optical waveguides 27 are one example of first optical transmission lines, the substrate 17 is one example of a base, the optical fibers 25 are one example of the second optical transmission lines, and the plug cover 469 is one example of the slider. Further, the optical fibers 25 may be used as the first optical transmission lines, and the optical waveguides 27 may be used as the second optical transmission lines.

(First Modification)

Figure 19A:
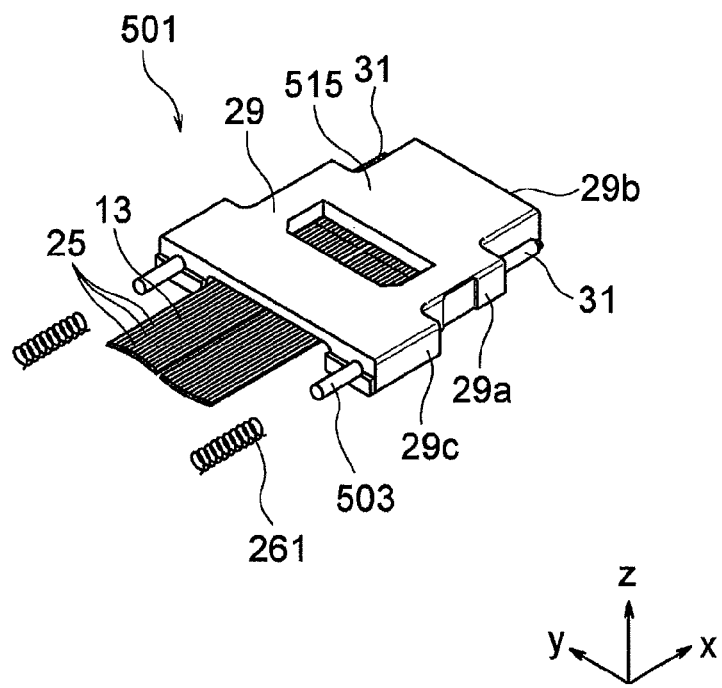
FIG. 19A and FIG. 19B are perspective views showing plugs according to modifications.

FIG. 19A is a perspective view showing a plug 501 according to the first modification.

The plug 501, in the same way as the second to fourth embodiments, has a narrow sense plug 515 the same as the plug 15 of the first embodiment, a not shown housing (may be either of the second to fourth housings) which holds the plug 515, and elastic members 261 which bias the plug 515 with respect to this housing.

However, the narrow sense plug 515, unlike the plug 15 of the first embodiment, has fastening-use protruding parts 503 for fastening the elastic members 261. The fastening-use protruding parts 503 are for example pin shaped so as to protrude from the rear end face of the plug 515 backward and are parallel to the connection direction of the optical transmission lines (direction perpendicular to the core end faces of the optical transmission lines). The elastic members 261, constituted by coil springs, are attached so that the fastening-use protruding parts 503 are inserted into them. Note that, the length of the fastening-use protruding parts 503 is for example not more than the length of the elastic members 261 in the compressed state where the plug 515 is held in the housing.

According to such a configuration, at least portions of the elastic members 261 are guided in the connection direction of the optical transmission lines by the fastening-use protruding parts 503, therefore deviation of the orientation of the biasing force of the elastic members 261 from the connection direction of the optical transmission lines is reduced. As a result, the connection loss in each product is reduced, and also the variation of the connection loss among a plurality of products is reduced.

(Second Modification)

Figure 19B:
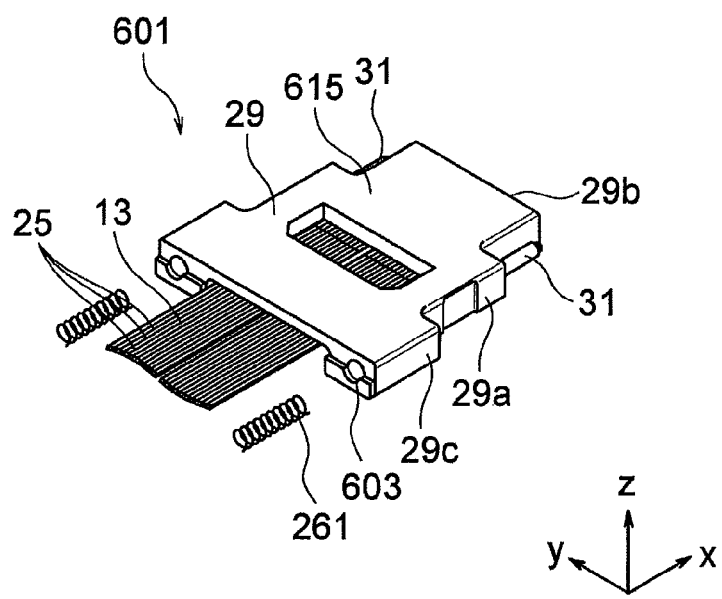

FIG. 19B is a perspective view showing a plug 601 according to a second modification.

In the plug 601, in place of the fastening-use protruding parts 503 in the first modification, fastening-use recessed parts 603 are formed in a narrow sense plug 615. The fastening-use recessed parts 603 are for example opened in the rear end face of the plug 615 and proceed to the depth direction parallel to the connection direction of the optical transmission lines. The coil springs comprising the elastic members 261 (can be other than the coil springs as well) are inserted into the fastening-use recessed parts 603. Note that, the depth of the fastening-use recessed parts 603 is for example not more than the length of the elastic members 261 in the compressed state where the plug 615 is held in the housing.

According to such a configuration, in the same way as the first modification, at least portions of the elastic members 261 are guided in the connection direction of the optical transmission lines by the fastening-use recessed parts 603, therefore deviation of orientation of the biasing force of the elastic members 261 from the connection direction of the optical transmission lines is reduced. As a result, the connection loss in each product is reduced, and also variation of connection loss among a plurality of products is reduced. Further, in the second modification, at least portions of the elastic members 261 are accommodated in the narrow sense plug 615, therefore the plug 601 can be reduced in size by making the clearance between the rear end face of the plug 615 and the housing smaller.

The present invention is not limited to the above embodiments and may be worked in various way.

The number of pins (pin holes) may be suitably set. Note, from the viewpoint of positioning with a high precision with a simple configuration, the number of pins is preferably two. Further, the positions of the pins relative to the protruding part or base may be suitably set. For example, the pins may be located in the direction perpendicular to the direction of arrangement of the plurality of optical fibers with respect to the protruding part holding the plurality of optical fibers. Further, for example, the pins may be located upper than the base (substrate) or lower than the base when viewed in the insertion direction as well.

The protruding part and exposing opening need not have the function of performing rough positioning before insertion of the pins into the pin holes. For example, the insertion of the protruding part into the exposing opening may be carried out after the start of insertion of the pins into the pin holes or the clearance between the protruding part and the exposing opening need not be set so as to become smaller as the insertion advances.

The holder which is configured by one metal sheet and fastens the receptacle to the base due to its restoring force is not an indispensable factor of the present invention. For example, the receptacle may be fastened to the base by an adhesive or may be pressed against the base and fastened to the base by a receptacle housing without a holder.

From the present application, the following other invention characterized by disengagement by the slider (plug cover 469) in the fourth embodiment can be extracted.

(Other Invention 1)

An optical connector having a first connector part which is fastened with respect to first optical transmission line and a second connector part which is fastened with respect to second transmission line and optically connects the first optical transmission line and the second optical transmission line by positioning together with the first connector part, wherein the second connector part has a positioning portion which is fastened with respect to the second optical transmission line and can be fitted with the first connector part by forward movement with respect to the first connector part, an engagement portion which is coupled to the positioning portion and can engage backward with respect to the first connector part in a state where it is fitted in the positioning portion, and a slider capable of moving backward with respect to the positioning portion while making the engagement portion displace to the direction of disengagement.

Concerning the above other invention, the receptacle 453 is one example of the first connector part, the plug 451 is one example of the second connector part, and the narrow sense plug 15 (plug body), the protruding part 29b, or pins 31 is one example of the positioning portion. Also, in the other invention described above, various suitable aspects of the present invention may be applied as well. The other invention may be executed in the following way as well (part is applicable to the present invention as well).

The optical connector is not limited to one connecting optical fibers and optical waveguides which are provided on the substrate. For example, the optical connector may be one connecting optical fibers to each other or may be one connecting optical waveguides to each other (substrates to each other). Further, the connector part holding the optical fibers may be one fastened to the substrate as well. The number of the first optical transmission lines and the second optical transmission lines connected by the optical connector may be one for each as well.

The first connector part and the second connector part are not limited to types (plug and receptacle) where roughly one as a whole is inserted into the other. For example, the first connector part and the second connector part may be types where the front end faces are made to abut against each other and the pins provided in one are inserted into the other.

The positioning portion of the second connector part is not limited to one which is inserted into the first connector part and may be one (one configuring the hole portion) into which at least a portion of the first connector part is inserted as well. From another viewpoint, an engagement portion and slider may be provided in a receptacle in which the plug is inserted or a connector part in which pin holes are formed.

It is not necessary for the first connector part to be able to connect a plurality of second connector parts. That is, the first connector part may be configured so that it can be connected to only one second connector part as well. Conversely, the first connector part may be connected to three or more second connector parts as well. Note that, a high density arrangement of the optical connectors is possible by arranging a plurality of first connector parts which can be connected to only single second connector parts as well.

In the embodiments, the engagement portion (465b) was provided in the member (plug holder 465) for holding the positioning portion (plug 15) and was coupled to be movable with respect to the positioning portion within the range of play. Note, the engagement portion may be directly fastened to the positioning portion (including the case where it is integrally formed with the positioning portion) as well. Note that, the term "coupling" includes fastening as well.

The shape of the engagement portion is not limited to one having a hole (notch). For example, it may be hook shape as well. The number of the engagement portions may be suitably set, is not limited to two, and may be only one or three or more. Further, the position of the engagement portion is not limited to the position which becomes above or below the optical transmission lines (direction crossing (perpendicular) with respect to the plurality of optical transmission lines which are arranged in the diameter direction and/or direction crossing (perpendicular) with respect to the major surface of the substrate). For example, the engagement portion may be located on the lateral side (y-direction) with respect to the optical transmission lines as well.

In a case where engagement portions are provided at the two sides of the direction of intersection with (perpendicular to) the connection direction of the optical transmission lines, this crossing direction is not limited to the up-down direction and may be a left-right direction (y-direction) as well. Further, in the case where engagement portions are provided at the two sides of the direction of intersection with (perpendicular to) the connection direction of the optical transmission lines, the two engagement portions may not be given shapes and positions where they are mutually rotational symmetric by 180° about a predetermined axis extending in the front-back direction (for example an axis passing through the center of a cross-section of all second optical transmission lines which are held by the second connector part).

The shape of the slider is not limited to a hollow shape configuring the upper surface, lower surface, and side surfaces of the second connector part. For example, the shape of the slider may be shape that is exposed on only the upper surface and/or lower surface like a slide switch as well.

The mechanism making the engagement portion displace according to the retraction of the slider is not limited to one by the inclined surface. For example, an engagement portion may be provided in a lever state capable of rocking so that its one end is engaged with the first connector part, and the slider abuts against the other end of the engagement portion. Further, in a case where the inclined surface is utilized for the displacement of the engagement portion, the inclined surface may be provided not in the slider, but in the engagement portion.

The direction making the engagement portion displace for disengagement is not limited to the direction toward the inside of the connector part. For example, the direction of displacement may be the direction to the outside of the connector part or may be the direction along the outer circumferential surface of the connector part (for example, the engagement portion may be made to displace to the lateral side in a case where the engagement portion is provided on the upper surface and/or lower surface or the engagement portion may be made displace upward or downward in a case where the engagement portion is provided on the side surface).

REFERENCE SIGNS LIST

1 . . . optical connector, 3 . . . optical transmission line, 17 . . . substrate (base), 15 . . . plug, 21 . . . receptacle, 21a . . . exposing opening, 21b . . . pin hole, 25 . . . optical fiber (second optical transmission line), 27 . . . optical waveguide (first optical transmission line), 29aa . . . facing surface, 29b . . . protruding part, and 31 . . . pin.

The invention claimed is:

1. An optical connector, comprising:
a receptacle which is fastened to a base comprising a first optical transmission line; and
a plug configured to hold a second optical transmission line and to be positioned with respect to the receptacle, wherein
the receptacle comprises
an exposing opening which exposes an end face of the first optical transmission line, and
a hole for a pin which opens in an opening direction of the exposing opening, the plug comprises
a facing surface which faces the receptacle,
a protruding part which protrudes from the facing surface, is integrally formed with the facing surface, exposes an end face of the second optical transmission line on a front end face thereof, and is configured to be inserted into the exposing opening, and
a pin which is located on the facing surface and is configured to be fitted in the hole, and
the front end face of the protruding part is located further toward to a side of an insertion direction than a front end of the pin.

2. The optical connector according to claim 1, wherein the exposing opening comprises an inclined surface which expands in diameter toward the opening portion at the side where the plug is inserted.

3. The optical connector according to claim 1, wherein, in the receptacle, on a cross-section vertical to the insertion direction, a clearance between the pin and the hole is smaller than a clearance between the protruding part and the exposing opening.

4. The optical connector according to claim 1, wherein
two or more the pins are comprised, and
the protruding part is located between the two pins.

5. The optical connector according to claim 1, wherein
the protruding part holds two or more the optical transmission lines in a state of arrangement in a diameter direction, and
the protruding part and the pin are located in a line in a direction of arrangement of the two or more second optical transmission lines.

6. The optical connector according to claim 1, further comprising a holder which is consist of a folded single metal sheet and nips the receptacle and the base in a direction making them be superimposed by a restoring force of the holder.

7. The optical connector according to claim 1, wherein
the protruding part is formed by a resin, and
the pin is formed by a metal.

8. The optical connector according to claim 1, further comprising:
a receptacle housing which comprises a housing opening and which fastens the receptacle to the first optical transmission line in a state where the exposing opening is exposed from the housing opening and
a plug housing which holds the plug is configured to be movable in a direction perpendicular to the protruding part with a play larger than the clearance between the pin and the hole in a state where the protruding part and the pin are exposed and which is fitted in the housing opening.

9. The optical connector according to claim 1, wherein the plug comprises
an engagement portion which is coupled to the pin and can engage backward with respect to the receptacle in the state where the pin is fitted in the hole and
a slider which can move backward with respect to the pin while making the engagement portion displace to a direction releasing the engagement thereof.

10. The optical connector according to claim 9, wherein the slider comprises an inclined surface which can abut backward with respect to the engagement portion and is located further in the direction releasing the engagement the further to the front.

11. The optical connector according to claim 9, wherein the slider is a hollow shape configuring the upper surface, lower surface, and side surfaces of the plug.

12. The optical connector according to claim 9, wherein the plug comprises
an advancement stopper which is coupled to the pin and with which the slider engages forward at the time when the slider is located at a position where the engagement of the engagement portion is not released and
a retraction stopper which is coupled to the pin and with which the slider engages backward at the time when the slider is located at a position releasing the engagement of the engagement portion.

13. The optical connector according to claim 9, wherein two the engagement portions are located at two sides in a direction perpendicular to a connection direction of the first optical transmission line and the second optical transmission line with respect to them.

14. The optical connector according to claim 9, wherein
the receptacle can be connected with a plurality of plugs which are located on a lateral line, and
the engagement portion is located in a direction which crosses a connection direction of the first optical transmission line and the second optical transmission line and crosses a arrangement direction of the plurality of plugs.

15. An optical transmission module, comprising:
a substrate,
a first optical transmission line which is disposed on a major surface of the substrate and comprises an end face which is exposed at a side surface of the substrate,
a second optical transmission line,
a receptacle which is fastened to the substrate, and
a plug configured to hold the second optical transmission line and to be positioned relative to the receptacle,
the receptacle comprises
an exposing opening which exposes the end face of the first optical transmission line and
a hole for pin which opens in an opening direction of the exposing opening,
the plug comprises
a facing surface which faces the receptacle,
a protruding part which protrudes from the facing surface, is integrally formed with the facing surface, exposes an end face of the second optical transmission line on its front end face, and configures to be inserted into the exposing opening, and
a pin which is located on the facing surface and configures to be fitted in the hole, and
the front end face of the protruding part is located previous position toward an insertion direction than a front end of the pin.

16. The optical transmission module according to claim 15, wherein at least a portion of the hole is superimposed at the side surface of the substrate when viewed in the insertion direction.

* * * * *